United States Patent [19]

Nakayama et al.

[11] Patent Number: 5,719,831
[45] Date of Patent: Feb. 17, 1998

[54] MAGNETO-OPTICAL RECORDING MEDIUM CARTRIDGE WHICH EMPLOYS MAGNETS

[75] Inventors: Junichiro Nakayama; Michinobu Mieda, both of Shiki-gun; Hiroyuki Katayama, Sakura; Akira Takahashi, Nara; Kenji Ohta, Kitakatsuragi-gun, all of Japan

[73] Assignee: Sharp Kabushiki Kaisha, Osaka, Japan

[21] Appl. No.: 768,794

[22] Filed: Dec. 18, 1996

Related U.S. Application Data

[63] Continuation of Ser. No. 359,058, Dec. 19, 1994, abandoned.

[30] Foreign Application Priority Data

Dec. 20, 1993 [JP] Japan ................... 5-319898

[51] Int. Cl.$^6$ ............................................. G11B 11/00
[52] U.S. Cl. ............................... 369/13; 369/77.2
[58] Field of Search .......................... 369/13, 14, 75.2, 369/75.1, 77.2, 77.1, 78, 79, 116, 275.5, 275.2, 291; 300/114, 59

[56] References Cited

U.S. PATENT DOCUMENTS

| | | | |
|---|---|---|---|
| 5,274,612 | 12/1993 | Sato et al. | 369/13 |
| 5,530,685 | 6/1996 | Katayama et al. | 369/13 |

FOREIGN PATENT DOCUMENTS

| | | |
|---|---|---|
| 1-184645 (A) | 7/1989 | Japan . |
| 5-120746 | of 1993 | Japan . |

OTHER PUBLICATIONS

J. Nakayama, et al., *Japanese Journal of Applied Physics*, vol. 32 (1993) pp. 5439–5440, "Direct Overwriting Using Magnetooptical Trilayer Medium and One Magnet."

Haruhisa Iida et al., Proc. Int. Symp. on Optical Memory, 1989 *Japanese Journal of Applied Physics*, vol. 28 (1989) Supplement 28–3, pp.367–370, "Recording Power Characteristics of 130mm Overwritable MO Disk by Laser Power Modulation Method."

*Primary Examiner*—Tan Dinh
*Attorney, Agent, or Firm*—David G. Conlin; Brian L. Michaelis

[57] ABSTRACT

A magneto-optical disk cartridge includes a magnet which is magnetized substantially parallel to a surface of a magneto-optical disk for generating an initializing magnetic field. This structure permits a reduction in the thickness of the magneto-optical disk cartridge.

10 Claims, 19 Drawing Sheets

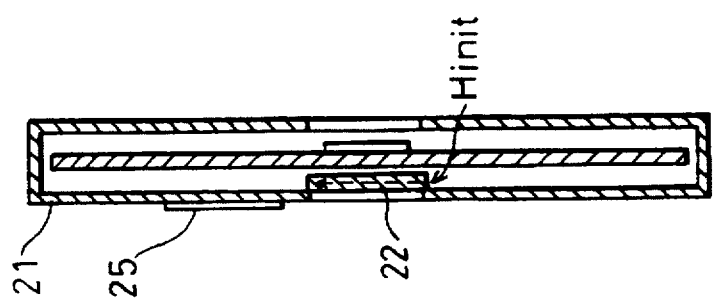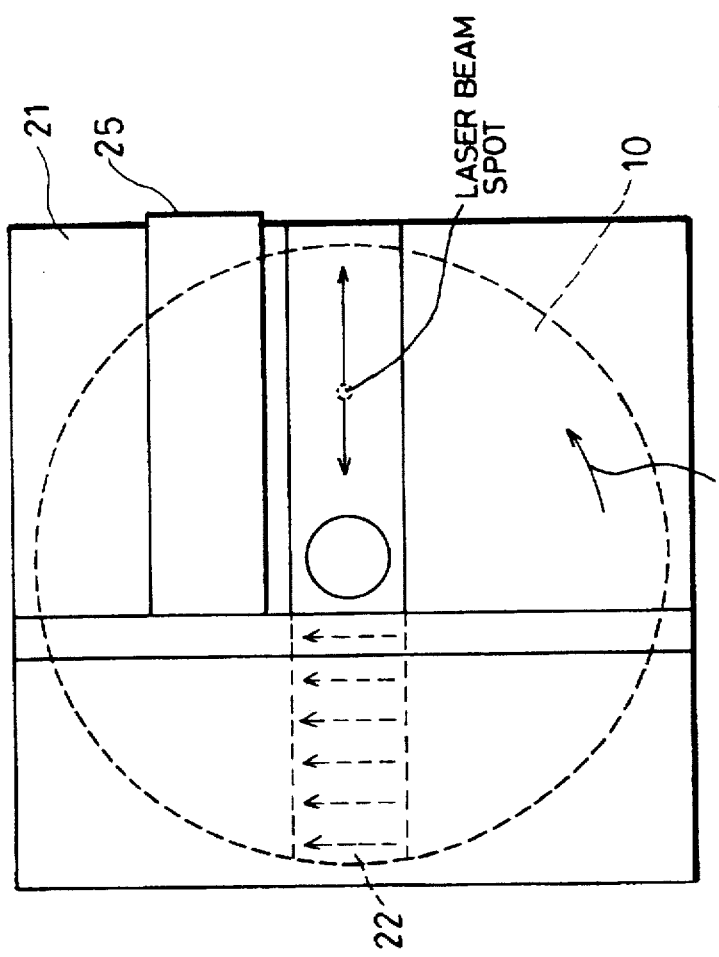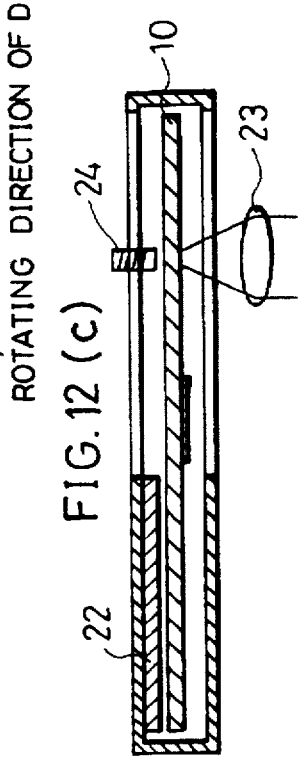

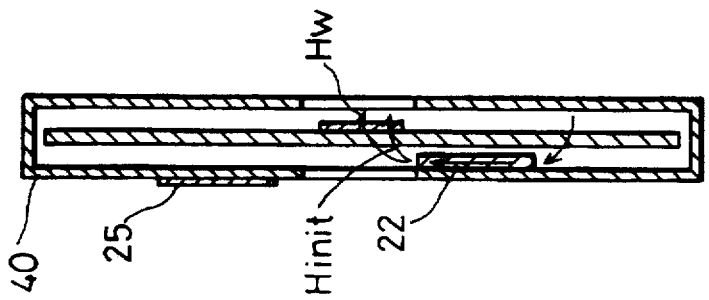
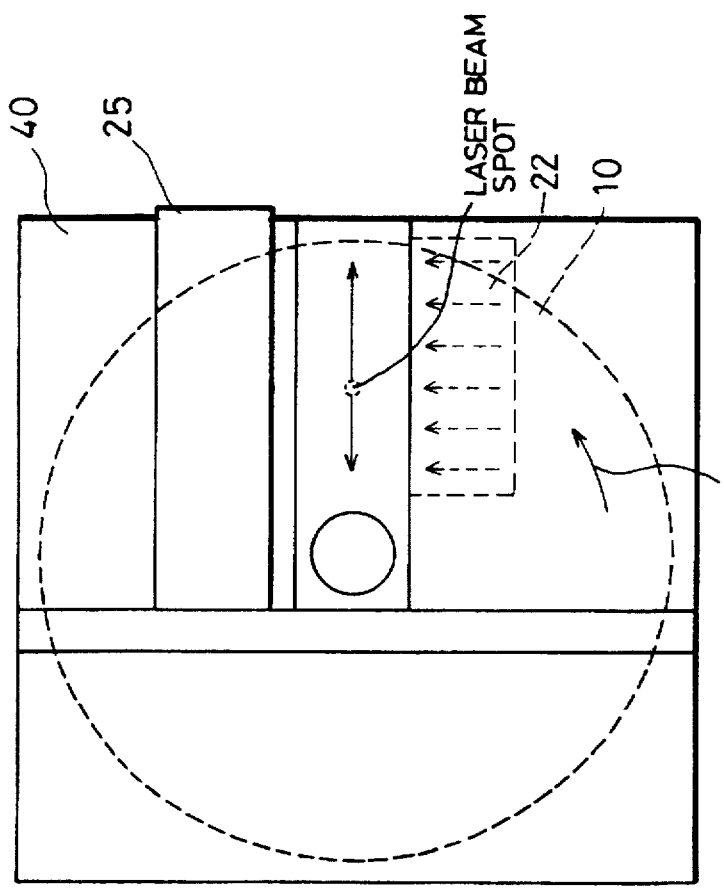
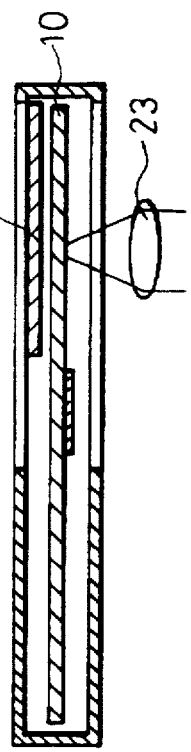

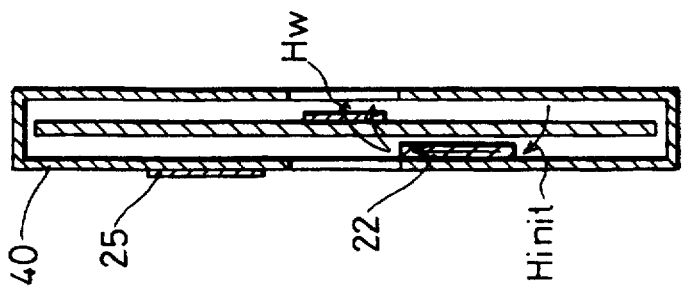
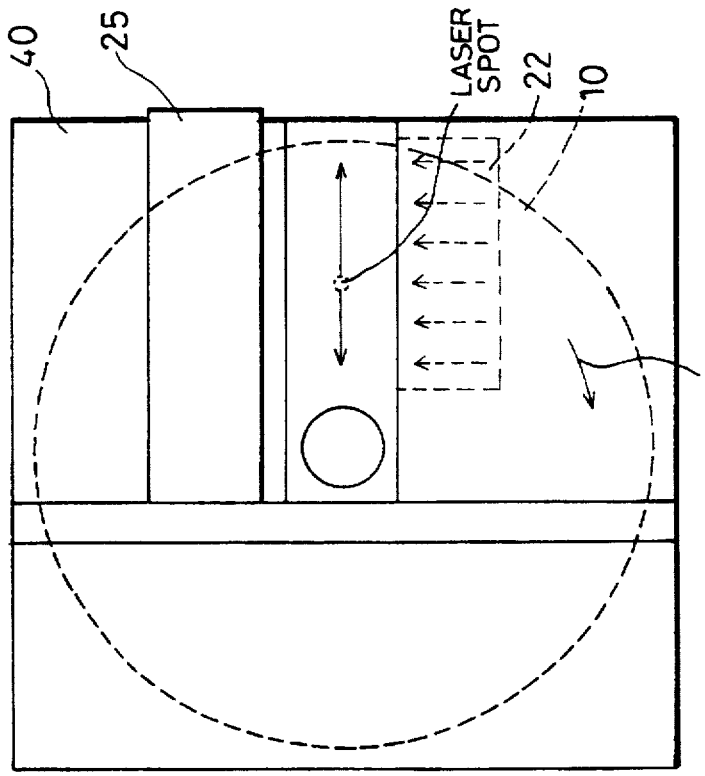
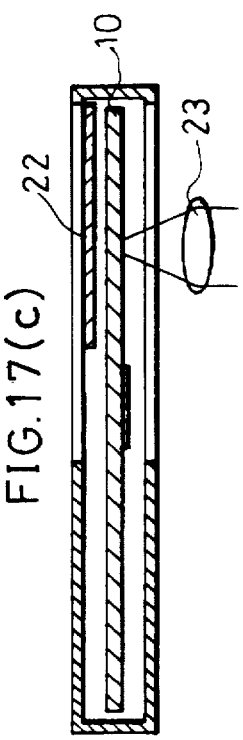

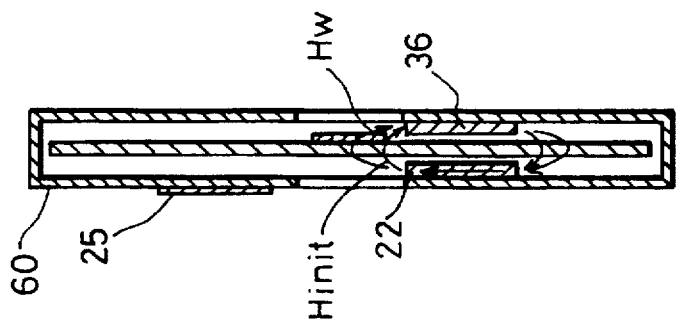
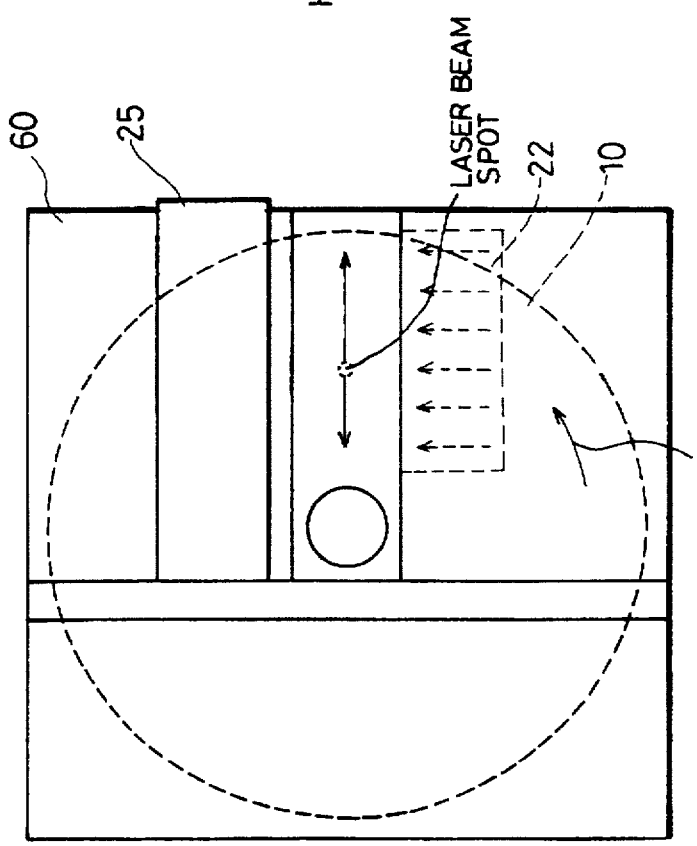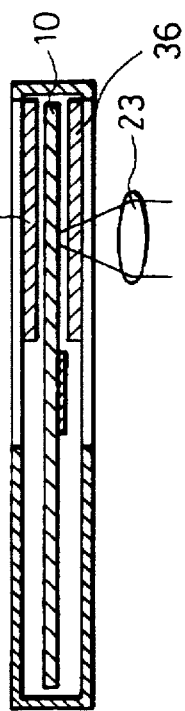

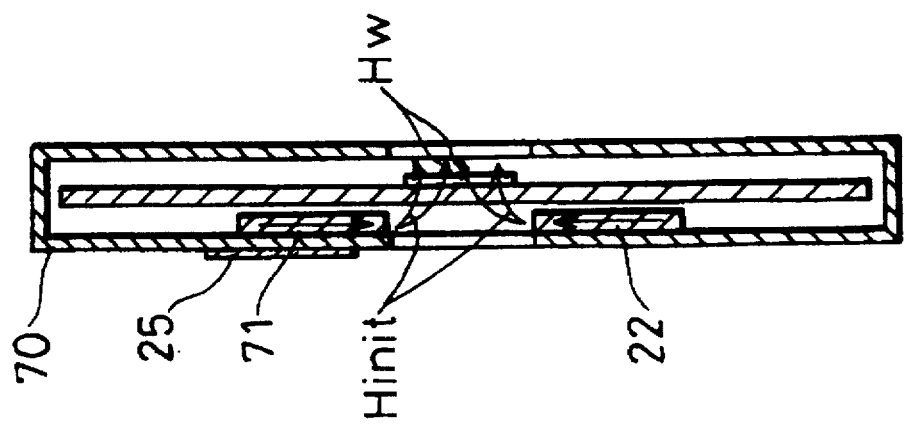
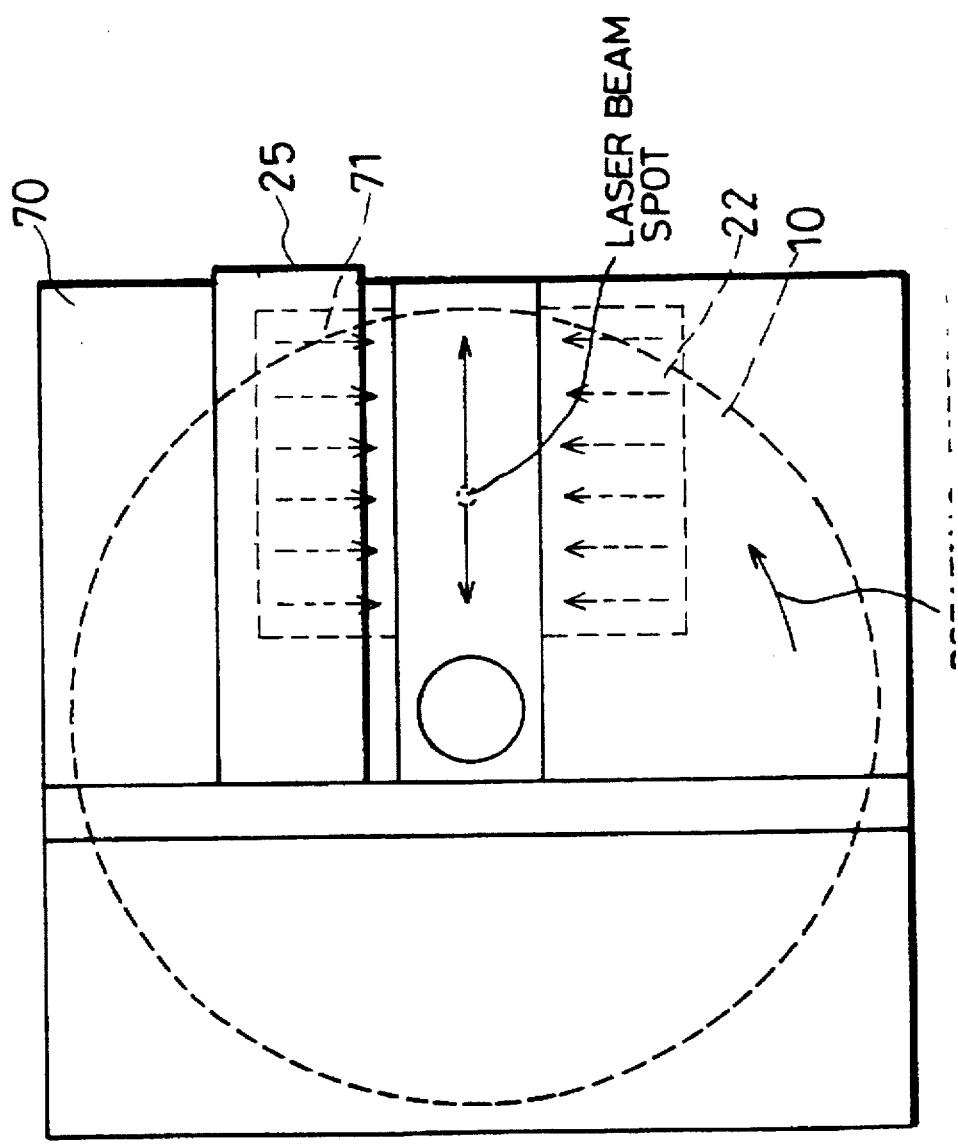

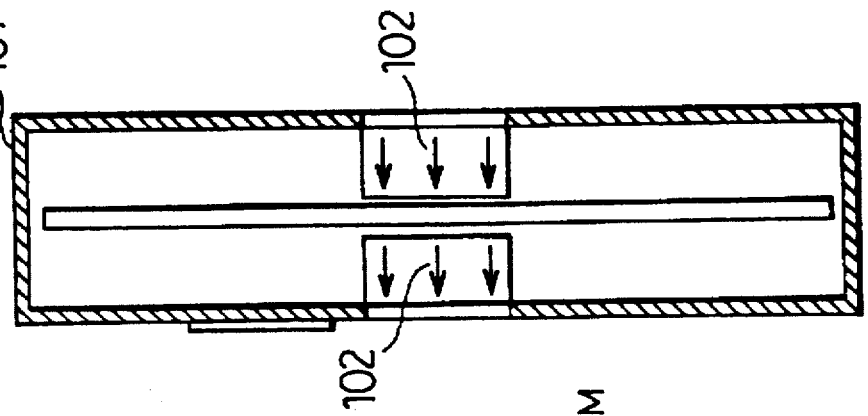
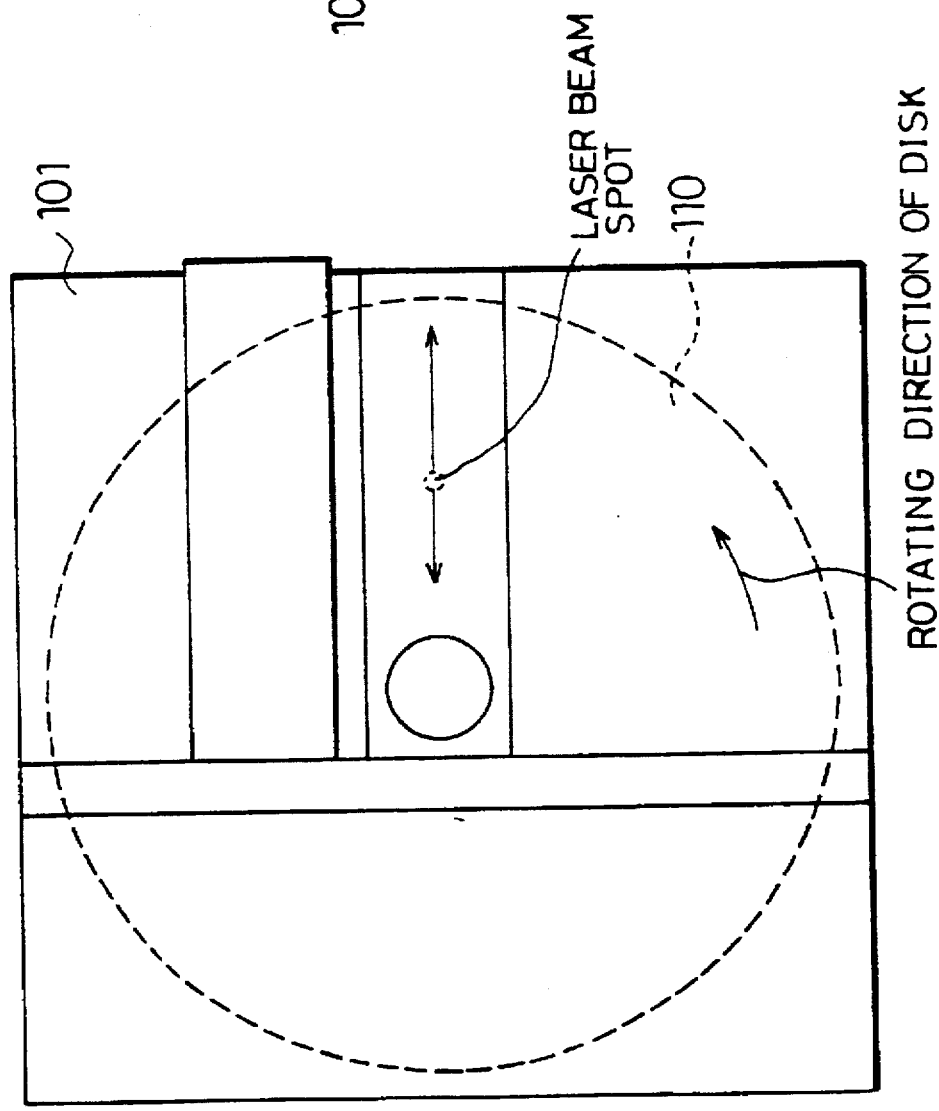

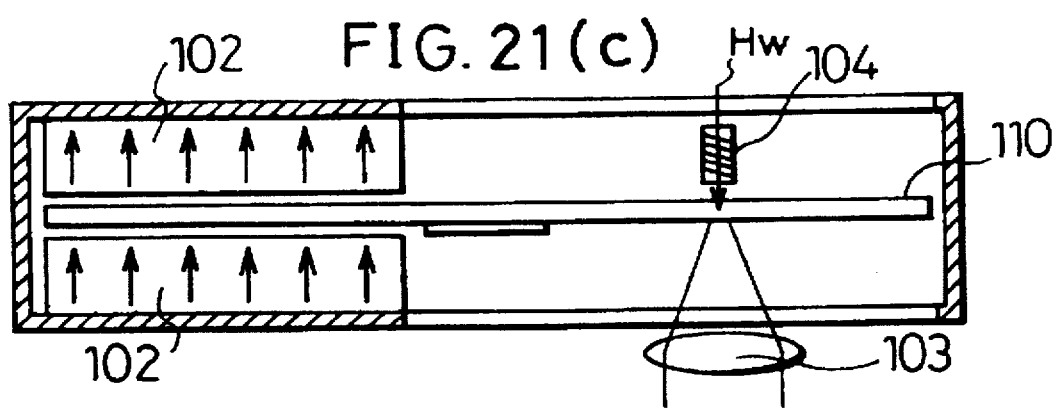

MAGNETO-OPTICAL RECORDING MEDIUM CARTRIDGE WHICH EMPLOYS MAGNETS

This application is a continuation of application Ser. No. 08/359,058 filed on Dec. 19, 1994 and now abandoned.

FIELD OF THE INVENTION

The present invention relates to a cartridge for containing an optical disk allowing at least optically recording, reproducing or erasing information thereon, and more particularly a magneto-optical disk which permits overwriting by light-intensity modulation.

BACKGROUND OF THE INVENTION

A magneto-optical recording method uses a recording medium which is fabricated by forming a perpendicularly magnetized film made of a magnetic substance on a substrate, and performs recording and reproducing of information as follows.

In recording, the recording medium is first initialized by, for example, a strong external magnetic field so as to align the direction of magnetization in one direction (upward or downward direction). Secondly, a laser beam is irradiated onto an area in which information is to be recorded so as to raise the temperature of the area of the recording medium around or higher than the Curie temperature, or around or higher than the compensating temperature so that the coercive force $H_c$ in the area becomes zero or almost zero. Then, an external magnetic field (bias magnetic field) whose direction is opposite to the direction of magnetization for initialization is applied so as to reverse the direction of magnetization. When the irradiation of the laser beam is stopped, the temperature of the recording medium returns to room temperature. As a result, the reversed magnetization is fixed, and information is thus thermomagnetically recorded.

On the other hand, information is optically reproduced by irradiating a linearly-polarized laser beam onto the recording medium and using a phenomenon in which the plane of polarization of the reflected light and of the transmitted light are rotated according to the direction of magnetization (Kerr effect, and Faraday effect).

A magneto-optical recording medium has been focused as a rewritable large-capacity memory element. For example, the magneto-optical recording medium can be reused (rewritten) by:

(a) initializing the magneto-optical recording medium by some techniques;
(b) enabling overwriting (rewriting without performing erasing) by improving the structure of an external magnetic field generating device; or
(c) enabling overwriting by improving the structure of the recording medium.

Here, (c) is most preferable. For example, Jap. Jour. Appl. Phys., Vol. 28 (1989) Suppl. 28-3, pp. 367–370 states that an overwritable recording medium is achieved by using a recording layer consisting of exchange-coupled two films.

When overwriting is performed by light-intensity modulation using two or three exchange-coupled films, an initializing magnetic field of a perpendicular direction is required. In order to record and erase information with a conventional magneto-optical recording device, there is a need to include a magnet for generating an initializing magnetic field in the cartridge.

In order to achieve a smaller magneto-optical recording device by reducing the thickness of the cartridge, it is necessary to reduce the thickness of the magnet in the cartridge. However, if a dimension of the perpendicularly-magnetized magnet in a perpendicular direction is reduced, a decreased magnetic field is generated.

Whereas, as illustrated in FIG. 21, a cartridge 101 disclosed in Japanese Publication for Unexamined Patent Application No. 120746/1993, includes a magnet 104 for applying a recording magnetic field to the position of a laser beam spot projected through an objective lens 103, and two magnets 102 which are disposed in opposite positions so that a recording medium 110 is placed therebetween. With this structure, an increased initializing magnetic field is obtained with a magnet of a reduced thickness by making the entire or part of cartridge 101 a magnetic substance and by using it as a yoke.

With this structure, however, in order to obtain an increased initializing magnetic field, since the entire or part of cartridge 101 needs to be made a magnetic substance and used as a yoke as mentioned above, the thickness of the cartridge for containing the magneto-optical recording medium can not be reduced.

Additionally, since the direction of initializing magnetic field is uniform, this structure is not applicable to a double-sided magneto-optical recording medium.

SUMMARY OF THE INVENTION

It is an object of the present invention to provide a magneto-optical recording medium cartridge with a reduced thickness.

Another object of the present invention is to provide a magneto-optical recording medium cartridge for a double-sided magneto-optical recording medium.

In order to achieve the above objects, a first magneto-optical recording medium cartridge of the present invention includes a magnet which is magnetized substantially parallel to a surface of a magneto-optical recording medium.

With this structure, since the magnet which is magnetized substantially parallel to the surface of the magneto-optical recording medium is included, even when the thickness of the magnet is reduced, the magnetic field generated by the magnet is not decreased. It is therefore possible to achieve a magneto-optical recording medium cartridge with a reduced thickness. In addition, it becomes unnecessary to include a device for generating a recording-use magnetic field in a magneto-optical recording device by adjusting the position of the magnet.

A second magneto-optical recording medium cartridge of the present invention is the first magneto-optical recording medium cartridge but includes two of the magnet, which are disposed in opposite positions so that the magneto-optical recording medium is placed therebetween and have magnetization of opposite directions.

With this structure, even when the thickness of each magnet is further decreased, the magnetic fields generated by these magnets are not decreased, and the leakage magnetic field from the magneto-optical recording medium cartridge is reduced. Moreover, it becomes unnecessary to include the device for generating a recording-use magnetic field in the magneto-optical recording device by adjusting the positions of the magnets. Furthermore, this structure is effective with respect to a double-sided magneto-optical recording medium.

A third magneto-optical recording medium cartridge of the present invention is the first magneto-optical recording medium cartridge but includes a yoke which is disposed in a position opposite to a magnet so that the magneto-optical recording medium is located between the yoke and the magnet.

With this structure, not only a perpendicular magnetic field is easily obtained, but also the leakage magnetic field from the magneto-optical recording cartridge is reduced.

A fourth magneto-optical recording medium cartridge of the present invention is the first magneto-optical recording medium cartridge but includes two of the magnet, which are disposed on one of the sides of the magneto-optical recording medium and have magnetization of opposite directions.

With this structure, even if the thickness of the magnet is further reduced, the magnetic field is not decreased, thereby achieving a reduction in the thickness of the magneto-optical recording medium cartridge.

For a fuller understanding of the nature and advantages of the invention, reference should be made to the ensuing detailed description taken in conjunction with the accompanying drawings.

BRIEF DESCRIPTION OF THE DRAWINGS

FIGS. 12(a) to 12(c) are views showing a schematic structure of a magneto-optical disk cartridge, FIG. 12(a) being a plan view, FIGS. 12(b) and 12(c) showing cross sections.

FIGS. 16(a) to 16(c) are views showing a schematic structure of a magneto-optical disk cartridge according to still another embodiment of the present invention, FIG. 16(a) being a plan view, FIGS. 16(b) and 16(c) showing cross sections.

FIGS. 17(a) to 17(c) are views explaining a structure of a modified example of the magneto-optical disk cartridge shown in FIGS. 16(a) to 16(c).

FIGS. 19(a) to 19(c) are views showing a schematic structure of a magneto-optical disk cartridge according to still another embodiment of the present invention, FIG. 19(a) being a plan view, FIGS. 19(b) and 19(c) showing cross sections.

FIGS. 20(a) to 20(c) are views showing a schematic structure of a magneto-optical disk cartridge according to still another embodiment of the present invention, FIG. 20(a) being a plan view, FIGS. 20(b) and 20(c) showing cross sections.

FIGS. 21(a) to 21(c) are views showing a schematic structure of a conventional magneto-optical disk cartridge, FIG. 21(a) being a plan view, FIGS. 21(b) and 21(c) showing cross sections.

DETAILED DESCRIPTION OF THE PREFERRED EMBODIMENTS

The following description discusses one embodiment the present invention.

Figure 1:
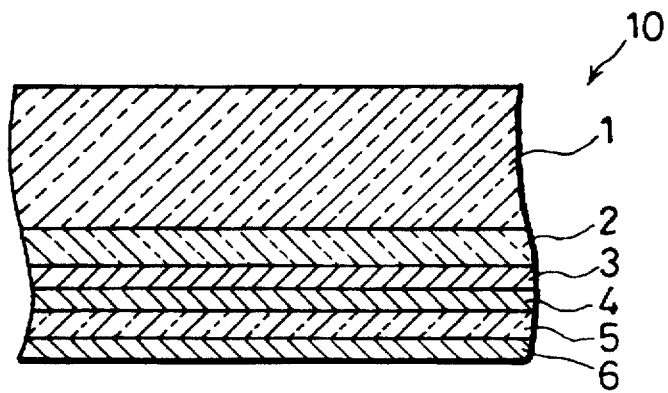
FIG. 1 is a cross section showing a schematic structure of a magneto-optical disk contained in a magneto-optical disk cartridge according to one embodiment of the present invention.

As illustrated in FIG. 1, a magneto-optical disk (magneto-optical recording medium) 10 contained in a magneto-optical disk cartridge (magneto-optical recording medium cartridge) of this embodiment includes a light transmitting substrate 1, a light transmitting transparent dielectric layer 2, a first magnetic layer 3, a second magnetic layer 4, a protective layer 5 and an overcoat layer 6 laminated in this order. The first magnetic layer 3 and the second magnetic layer 4 are made of rare-earth and transition metal alloys.

Figure 2:
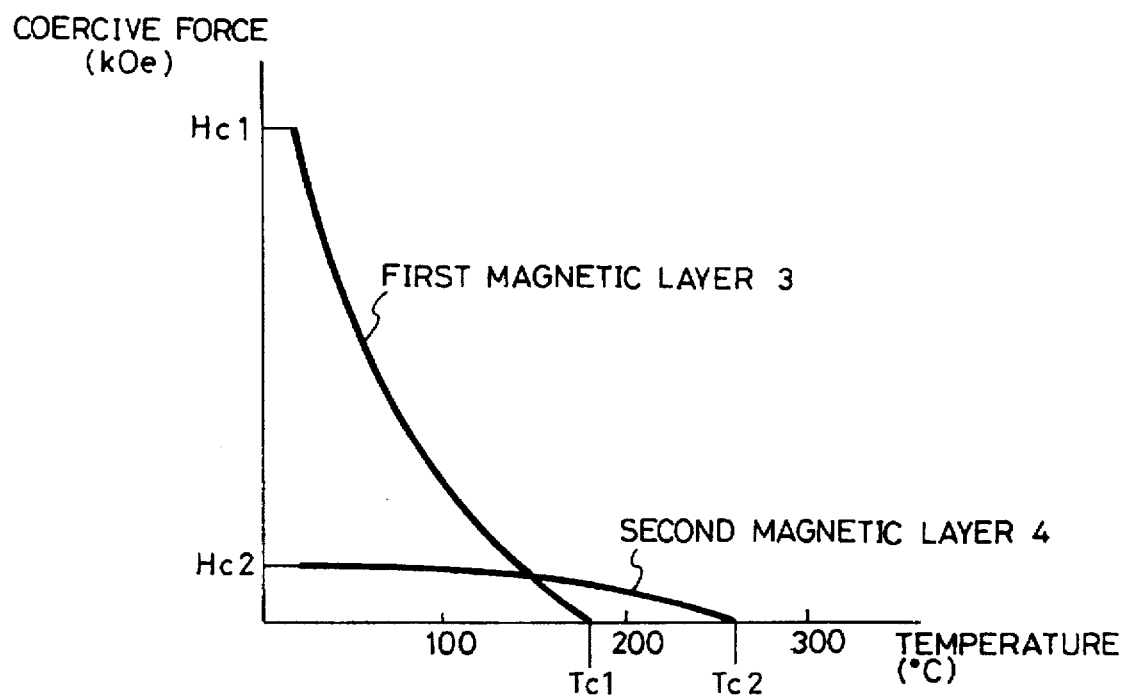
FIG. 2 is a graph showing a temperature dependence of the coercive force of each magnetic layer of the magneto-optical disk shown in FIG. 1.

As illustrated in FIG. 2, the first magnetic layer 3 has a lower Curie temperature Tc1, and a higher coercive force Hc1 at room temperature compared with the second magnetic layer 4. The first magnetic layer 3 is in a transition metal rich state and perpendicular magnetic anisotropy is larger than in-plane magnetic anisotropy in a temperature range between room temperature and Tc1. In the transition metal rich state, the magnetization of the sublattice of the transition metal is larger than the magnetization of the sublattice of the rare-earth metal.

The second magnetic layer 4 has a Curie temperature Tc2 which is higher than Tc1, and a coercive force Hc2 which is lower than Hc1 at room temperature. The second magnetic layer 4 is in a rare-earth metal rich state and perpendicular magnetic anisotropy is larger than in-plane magnetic anisotropy in a temperature range between room temperature and Tc2. In the rare-earth metal rich state, the magnetization of the sublattice of the rare-earth metal is larger than the magnetization of the sublattice of the transition metal.

The following description discusses processes of overwriting a first magneto-optical disk 10 by light-intensity modulation.

Figure 3:
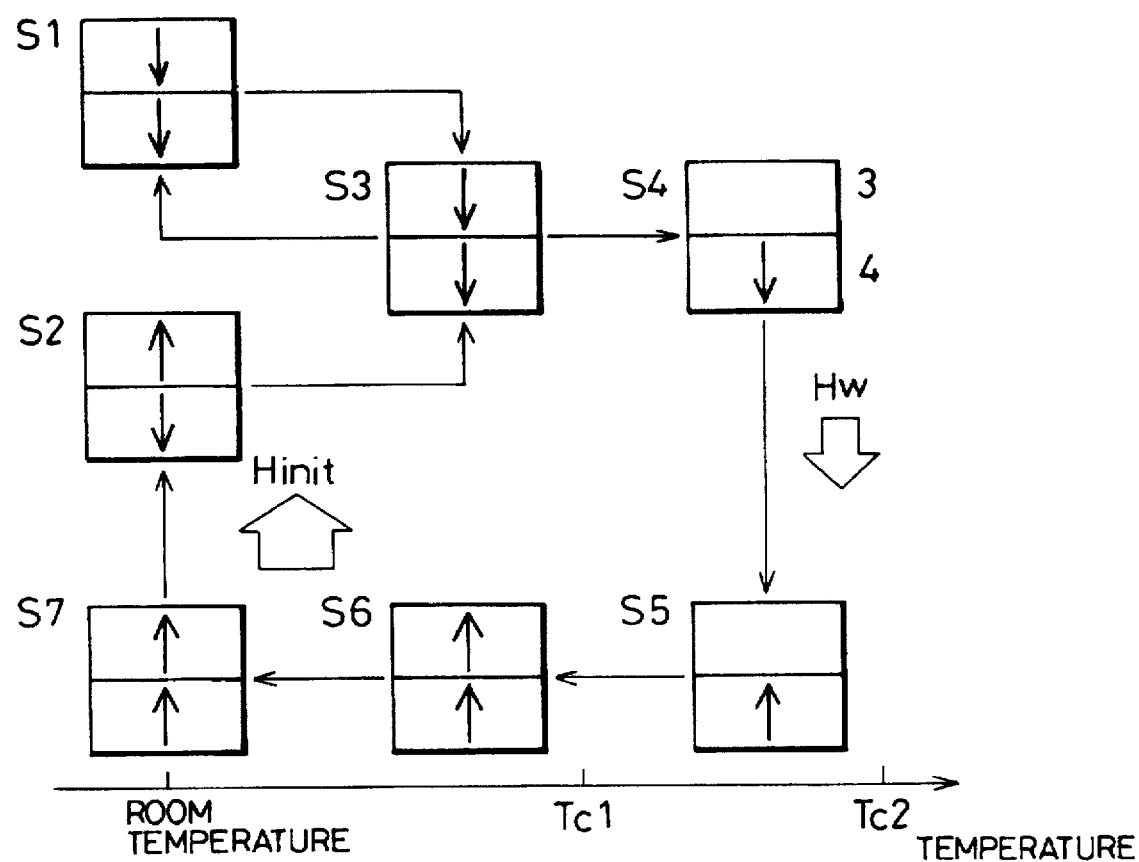
FIG. 3 is a view explaining a process of recording information on the magneto-optical disk shown in FIG. 1.

FIG. 3 shows states of magnetization of the first magnetic layer 3 and the second magnetic layer 4. In FIG. 3, the horizontal axis indicates temperatures. Since these layers are made of the rare-earth and transition metal alloys, the total magnetization, the magnetization of the sublattice of the rare-earth metal and the magnetization of the sublattice of the transition metal exist. Arrows show the direction of the magnetization of the sublattice of the transition metal of each of these layers 3 and 4.

When overwriting such a magneto-optical disk 10 by light-intensity modulation, the second magnetic layer 4 is first initialized. Specifically, an upward initializing magnetic field Hinit which is larger than Hc2 but smaller than Hc1 at room temperature is applied to the second magnetic layer 4 so as to align only the direction of the total magnetization of the second magnetic layer 4 in a uniform direction.

Figure 4:
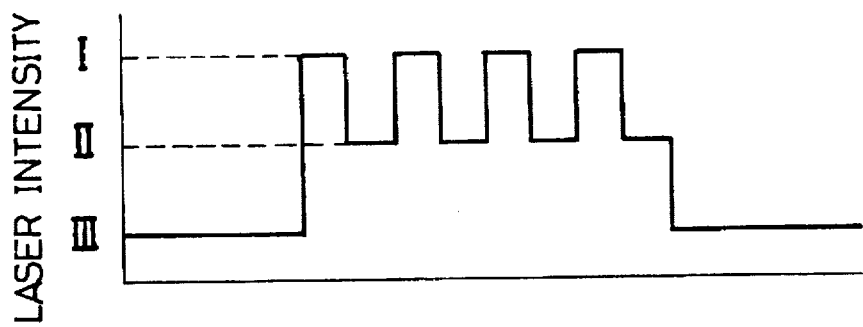
FIG. 4 is a graph showing the intensity of laser light irradiated on the magneto-optical disk shown in FIG. 1.
Figure 5:
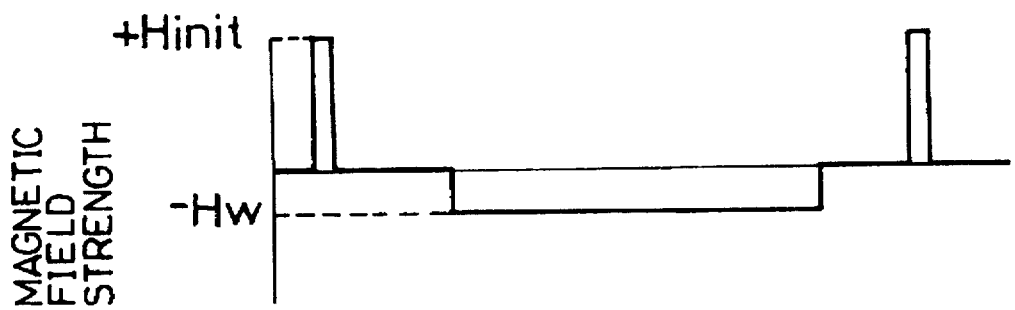
FIG. 5 is a graph showing the strength of a magnetic field applied to the magneto-optical disk shown in FIG. 1.

Additionally, by applying intensity-modulated laser light shown in FIG. 4, Hinit, and a recording magnetic field Hw having a direction opposite to Hinit and a strength smaller than Hinit (as shown in FIG. 5) to a portion to be irradiated by the laser light, a high process of applying laser light of high level I for raising the temperature of the portion irradiated by the laser light to near Tc2 and a low process of applying laser light of low level II for raising the temperature of the portion irradiated by the laser light to near Tc1 are repeatedly performed. This permits rewriting of information by overwriting.

Two states S1 and S2 are observed at room temperature depending on the direction of magnetization of the first magnetic layer 3. Since the coercive force Hc2 of the second magnetic layer 4 is small at room temperature, the direction of the total magnetization becomes parallel to Hinit. Moreover, since the second magnetic layer 4 has a rare-earth metal rich composition, the direction of the total magnetization becomes opposite to the direction of magnetization of the sublattice of the transition metal. Namely, the direction of the sublattice of magnetization of the transition metal becomes opposite to Hinit.

In the high process, when the temperature of the portion irradiated by the laser light is raised to near Tc2, the direction of magnetization of the second magnetic layer 4 is switched and becomes opposite to Hw. In short, the states S1 and S2 change to S5 through S3 and S4.

With a rotation of the magneto-optical disk 10, a different portion of the magneto-optical disk 10 is irradiated by the laser light, and the previously irradiated portion is cooled down. Then, the magnetization of the sublattice of the first magnetic layer 3 is aligned with the direction of the magnetization of the sublattice of the second magnetic layer 4 by an exchange force exerted on the phase boundary between the first magnetic layer 3 and the second magnetic layer 4. Consequently, the state S5 changes to S7 through S6.

Furthermore, when Hinit is applied at room temperature, the direction of magnetization of the first magnetic layer 3 with a larger coercive force remains unchanged, while the direction of magnetization of the second magnetic layer 4 of a smaller coercive force is reversed. Namely, the state S7 changes to S2.

In the low process, when the temperature of the portion irradiated by the layer light is raised to near Tc1, the direction of magnetization of the second magnetic layer 4 is not reversed by Hw because the coercive force of the second magnetic layer 4 is larger than Hw.

With a rotation of the magneto-optical disk 10, a different portion of the magneto-optical disk 10 is irradiated by the laser light, and the previously irradiated portion is cooled down. Then, like the above-mentioned process, the magnetization of the sublattice of the first magnetic layer 3 is aligned with the direction of the magnetization of the sublattice of the second magnetic layer 4 by the exchange force exerted on the phase boundary between the first magnetic layer 3 and the second magnetic layer 4. Consequently, the states S1 and S2 change to S1 through S3.

As described above, in the high process, the first magnetic layer 3 moves to the state S2 in which the total magnetization is orientated in the upward direction (i.e., the magnetization of the sublattice of the transition metal is orientated in the upward direction). On the other hand, in the low process, the first magnetic layer 3 moves to the state S1 in which the total magnetization is orientated in the downward direction (i.e., the magnetization of the sublattice of the transition metal is orientated in the downward direction). It is thus possible to carry out overwrite recording by light-intensity modulation.

During reproduction, laser light of level III which is considerably lower than the laser light used for recording is irradiated, and information is reproduced by detecting a rotation of the plane of polarization of the reflected light.

A sample of the magneto-optical disk 10 is described below. Sample #1 includes the substrate 1 made of a disk-shaped glass with an outer diameter of 86 mm, an inner diameter of 15 mm and a thickness of 1.2 mm. Guide tracks in the form of grooves and lands are formed on one of the surfaces of the substrate 1, for guiding light beam. The track pitch is 1.6 μm, the width of a groove is 0.8 nμm, and the width of a land is 0.8 μm. The guide tracks were directly formed on the glass by reactive ion etching.

The sample #1 includes the transparent dielectric layer 2, the first magnetic layer 3, the second magnetic layer 4, and the protective layer 5 that are formed on a surface of the substrate 1 whereupon the guide tracks are formed. The transparent dielectric layer 2 is formed by AlN with a thickness of 70 nm by reactive ion etching. The first magnetic layer 3 is formed by DyFeCo with a thickness of 50 nm by simultaneously sputtering from Dy, Fe, and Co targets. The second magnetic layer 4 is formed by GdDyFeCo with a thickness of 50 nm by simultaneously sputtering from Gd, Dy, Fe, and Co targets. The protective layer 5 is formed by AlN with a thickness of 70 nm.

The sputtering conditions for forming the first magnetic layer 3 and the second magnetic layer 4 are that the ultimate vacuum is not higher than $2.0 \times 10^{-4}$ Pa, the Ar gas pressure is $6.5 \times 10^{-1}$ Pa and the discharge power is 300 W. The sputtering conditions for forming the transparent dielectric layer 2 and the protective layer 5 are that the ultimate vacuum is not higher than $2.0 \times 10^{-4}$ Pa, the $N_2$ gas pressure is $3.0 \times 10^{-1}$ Pa and the discharge power is 800 W.

The overcoat layer 6 is formed by coating an acrylate series ultraviolet hardening resin on the protective layer 5 and hardening the resin by the application of ultraviolet rays.

The first magnetic layer 3 is composed of $Dy_{0.19}(Fe_{0.88}Co_{0.14})_{0.81}$ with a transition metal rich composition, Tc1=170° C. and coercive force Hc1=12 kOe at room temperature. The second magnetic layer 4 is composed of $(Gd_{0.50}Dy_{0.50})_{0.32}(Fe_{0.68}Co_{0.32})_{0.68}$ with a rare-earth metal rich composition, Tc2=250° C. and coercive force Hc2=1.5 kOe at room temperature.

As illustrated in FIGS. 12(a) to 12(c), a magneto-optical disk cartridge 21 of this embodiment contains the magneto-optical disk 10 having at least the two magnetic layers as mentioned above. The magneto-optical disk cartridge 21 is provided with a magnet 22 which is located near a surface of the magneto-optical disk 10. The magnet 22 is magnetized in parallel with the magneto-optical disk 10, and generates a magnetic field whose direction is substantially perpendicular to a surface of the magneto-optical disk 10 in a section where the magneto-optical disk is stored.

The magneto-optical disk cartridge 21 also includes therein an objective lens 23 for applying a light beam to the magneto-optical disk 10, and an electromagnet 24 for applying the recording magnetic field Hw to a portion where the light beam is irradiated through the objective lens 23. In order to bring the magneto-optical disk 10 to be irradiated only when recording and reproducing information, a shutter 25 is provided.

Information was recorded on and reproduced from the sample #1 of the magneto-optical disk 10 using the magneto-optical disk cartridge 21 under the conditions where laser power PH of high level I was 10 mW, laser power PL of low level II was 2 mW, reproducing laser power PR of level III was 1 mW, a recording bit length was 0.65 µm and recording magnetic field Hw was 400 (Oe). The result shows that overwriting by light-intensity modulation was satisfactory without old information remaining on the magneto-optical disk 10, and a satisfactory signal to noise ratio (C/N) of 46 dB was achieved.

The magnet 22 is an Nd series permanent magnet of 1.21 T (tesla). The dimensions of the magnet 22 are 24 mm (width in a radial direction of the magneto-optical disk 10)×2 mm (height)×10 mm (length in a rotating direction of the magneto-optical disk 10). The actual distance (hereinafter referred to as gap) between the magnet 22 and the magneto-optical disk 10 is 1 mm. The magneto-optical disk 10 was initialized just above the magnet 22 by a magnetic field (initializing magnetic field) of the magnet 22. Information was recorded in a portion of the magneto-optical disk 10 onto which laser beam spot is converged by the objective lens 23. The magnetic field Hinit generated just above the magnet 22 was not lower than 2.5 kOe.

Figure 11:
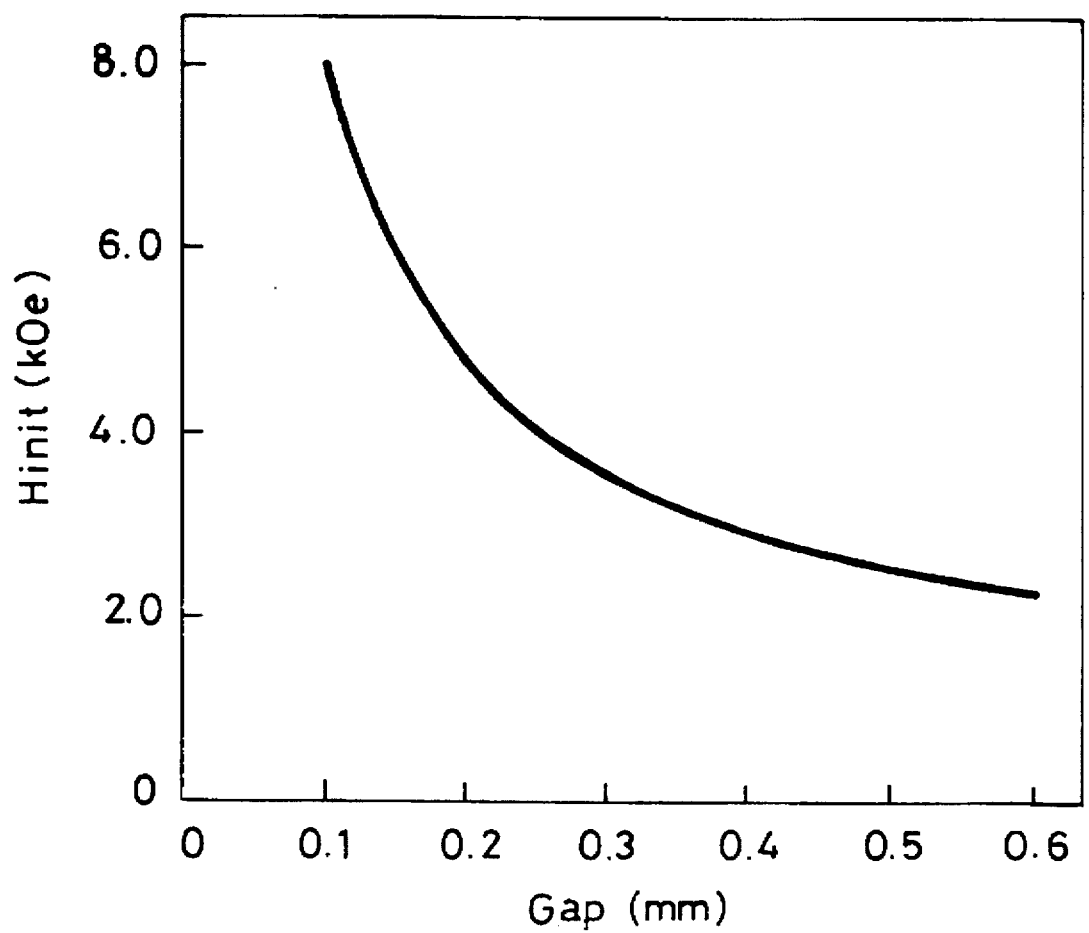
FIG. 11 is a graph showing the relation between a magnetic field generated by a magnet and a gap between the magnet and the magneto-optical disk.

The distance between the magneto-optical disk 10 and the magneto-optical disk cartridge 21 was fixed to 1.8 mm using the permanent magnet of 1.21 T as the magnet 22, and the height of the magnet 22 was arranged to be equal to a value obtained by 1.8 mm–gap. The relation between the gap and the initializing magnetic field is shown in FIG. 11. Since the initializing magnetic field Hinit of sample #1 was not lower than 2.5 kOe, overwriting by light-intensity modulation was satisfactory without old information remaining on the magneto-optical disk 10 when the magnet 22 had a height not lower than 1.3 mm, and a satisfactory signal to noise ratio (C/N) of 46 dB was achieved.

Moreover, when the magnet 22 was a permanent magnet having 1.21 T, and dimensions (width×height×length) and a gap shown in Table 1, overwriting by light-intensity modulation was satisfactory without old information remaining on the magneto-optical disk 10, and a satisfactory signal to noise ratio (C/N) of 46 dB was achieved.

TABLE 1

| Width | Height | Length | (unit: mm) Gap |
|---|---|---|---|
| 20 | 2 | 24 | 0.5 |
| 20 | 1 | 24 | 0.5 |
| 20 | 1 | 24 | 1.0 |
| 20 | 2 | 26 | 0.5 |
| 20 | 2 | 26 | 1.0 |
| 20 | 1 | 26 | 0.5 |
| 20 | 1 | 26 | 1.0 |
| 24 | 2 | 24 | 0.5 |
| 24 | 2 | 24 | 1.0 |
| 24 | 1 | 24 | 0.5 |
| 24 | 1 | 24 | 1.0 |
| 27 | 2 | 27 | 0.5 |

TABLE 1-continued

| Width | Height | Length | (unit: mm) Gap |
|---|---|---|---|
| 27 | 2 | 27 | 1.0 |
| 27 | 1 | 27 | 0.5 |
| 27 | 1 | 27 | 1.0 |
| 24 | 2 | 10 | 0.5 |
| 24 | 1.5 | 10 | 0.5 |
| 24 | 1.2 | 10 | 0.4 |
| 24 | 0.9 | 10 | 0.3 |
| 27 | 1.4 | 10 | 0.5 |
| 27 | 1.1 | 10 | 0.4 |
| 27 | 0.8 | 10 | 0.3 |

As shown above, since one magnet which has been magnetized substantially parallel to the surface of the magneto-optical recording medium is used, even if the thickness of the magnet is reduced, the strength of magnetic field generated by the magnet is not decreased. It is therefore possible to reduce the thickness of the magneto-optical recording medium cartridge.

The following description explains other samples of the first magneto-optical disk 10.

Samples #2 to #5 are the same as the sample #1 except the first magnetic layer 3.

The first magnetic layer 3 of the sample #2 is composed of $Dy_{0.21}(Fe_{0.84}Co_{0.16})_{0.79}$ with a transition metal rich composition, Tc1=170° C. and coercive force Hc1=15 kOe at room temperature.

The first magnetic layer 3 of the sample #3 is composed of $Dy_{0.23}(Fe_{0.84}Co_{0.16})_{0.77}$ with a compensating composition, Tc1=150° C. and coercive force Hc1≧20 kOe at room temperature.

The first magnetic layer 3 of the sample #4 is composed of $Dy_{0.23}(Fe_{0.80}Co_{0.20})_{0.77}$ with a compensating composition, Tc1=165° C. and coercive force Hc1≧20 kOe at room temperature.

The first magnetic layer 3 of the sample #5 is composed of $Dy_{0.19}(Fe_{0.84}Co_{0.16})_{0.81}$ with a transition metal rich composition, Tc1=200° C. and coercive force Hc1=8 kOe at room temperature.

Samples #6 to #9 are the same as the sample #1 except the second magnetic layer 4.

The second magnetic layer 4 of the sample #6 is composed of $(Gd_{0.50}Dy_{0.50})_{0.33}(Fe_{0.68}Co_{0.32})_{0.67}$ with a rare-earth metal rich composition, Tc2=240° C. and coercive force Hc2=1.2 kOe at room temperature.

The second magnetic layer 4 of the sample #7 is composed of $(Gd_{0.50}Dy_{0.50})_{0.34}(Fe_{0.68}Co_{0.32})_{0.66}$ with a rare-earth metal rich composition, Tc2=220° C. and coercive force Hc2=1.1 kOe at room temperature.

The second magnetic layer 4 of the sample #8 is composed of $(Gd_{0.60}Dy_{0.40})_{0.32}(Fe_{0.70}Co_{0.30})_{0.68}$ with a rare-earth metal rich composition, Tc2=250° C. and coercive force Hc2=1.4 kOe at room temperature.

The second magnetic layer 4 of the sample #9 is composed of $(Gd_{0.70}Dy_{0.30})_{0.32}(Fe_{0.75}Co_{0.25})_{0.68}$ with a rare-earth metal rich composition, Tc2=250° C. and coercive force Hc2=1.2 kOe at room temperature. With the samples #2 to #9, overwriting by light-intensity modulation was satisfactory without old information remaining on the magneto-optical disk 10, and a satisfactory signal to noise ratio (C/N) of 46 dB was achieved.

Figure 6:
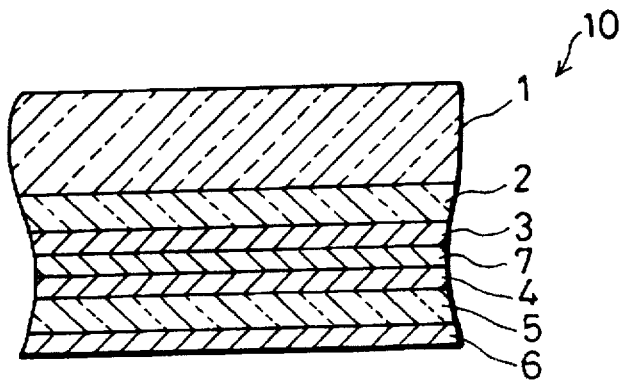
FIG. 6 is a cross section showing a schematic structure of a magneto-optical disk according to another embodiment.

As illustrated in FIG. 6, a second magneto-optical disk 10 of this embodiment includes the light transmitting substrate 1, the light transmitting transparent dielectric layer 2, the first magnetic layer 3, a third magnetic layer 7, the second magnetic layer 4, the protective layer 5 and the overcoat layer 6 laminated in this order. The first magnetic layer 3, the second magnetic layer 4 and the third magnetic layer 7 are made of rare-earth and transition metal alloys.

Figure 7:
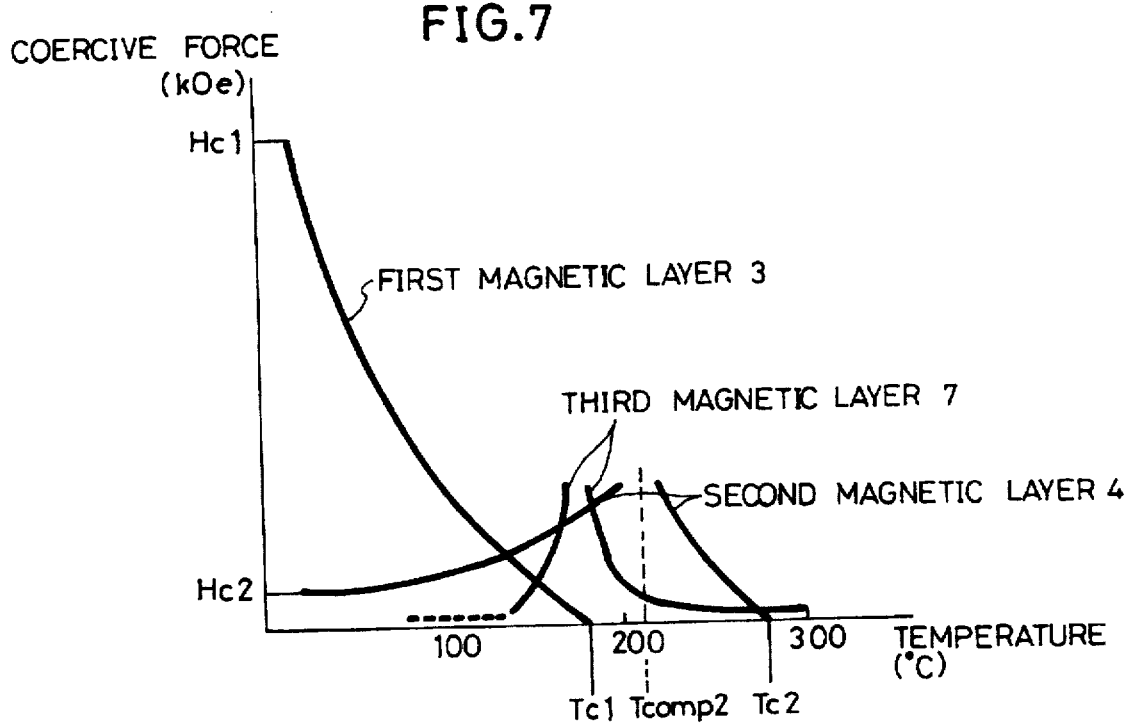
FIG. 7 is a graph showing a temperature dependency of the coercive force of each magnetic layer of the magneto-optical disk shown in FIG. 6.

As illustrated in FIG. 7, the first magnetic layer 3 has a lower Curie temperature Tc1, and a higher coercive force Hc1 at room temperature compared with the second magnetic layer 4. The first magnetic layer 3 is in a transition metal rich state and perpendicular magnetic anisotropy is larger than in-plane magnetic anisotropy in a temperature range between room temperature and Tc1.

The second magnetic layer 4 has a Curie temperature Tc2 which is higher than Tc1, a coercive force Hc2 which is lower than Hc1 at room temperature, and a compensating temperature Tcomp2 between room temperature and Tc2. Perpendicular magnetic anisotropy is larger than in-plane magnetic anisotropy in a temperature range between room temperature and Tc2. The second magnetic layer 4 is in a rare-earth metal rich state in a temperature range between room temperature and Tcomp 2, and in a transition metal rich state in a temperature range between Tcomp 2 and Tc2.

The third magnetic layer 7 has a Curie temperature Tc3 which is higher than the Curie temperature Tc1 of the first magnetic layer 3. The third magnetic layer 7 has such characteristics that in-plane magnetic anisotropy becomes larger than perpendicular magnetic anisotropy at room temperature and that perpendicular magnetic anisotropy becomes larger than in-plane magnetic anisotropy at temperatures above a predetermined temperature.

The following description discusses processes of overwriting the second magneto-optical disk 10 by light-intensity modulation.

Figure 8:
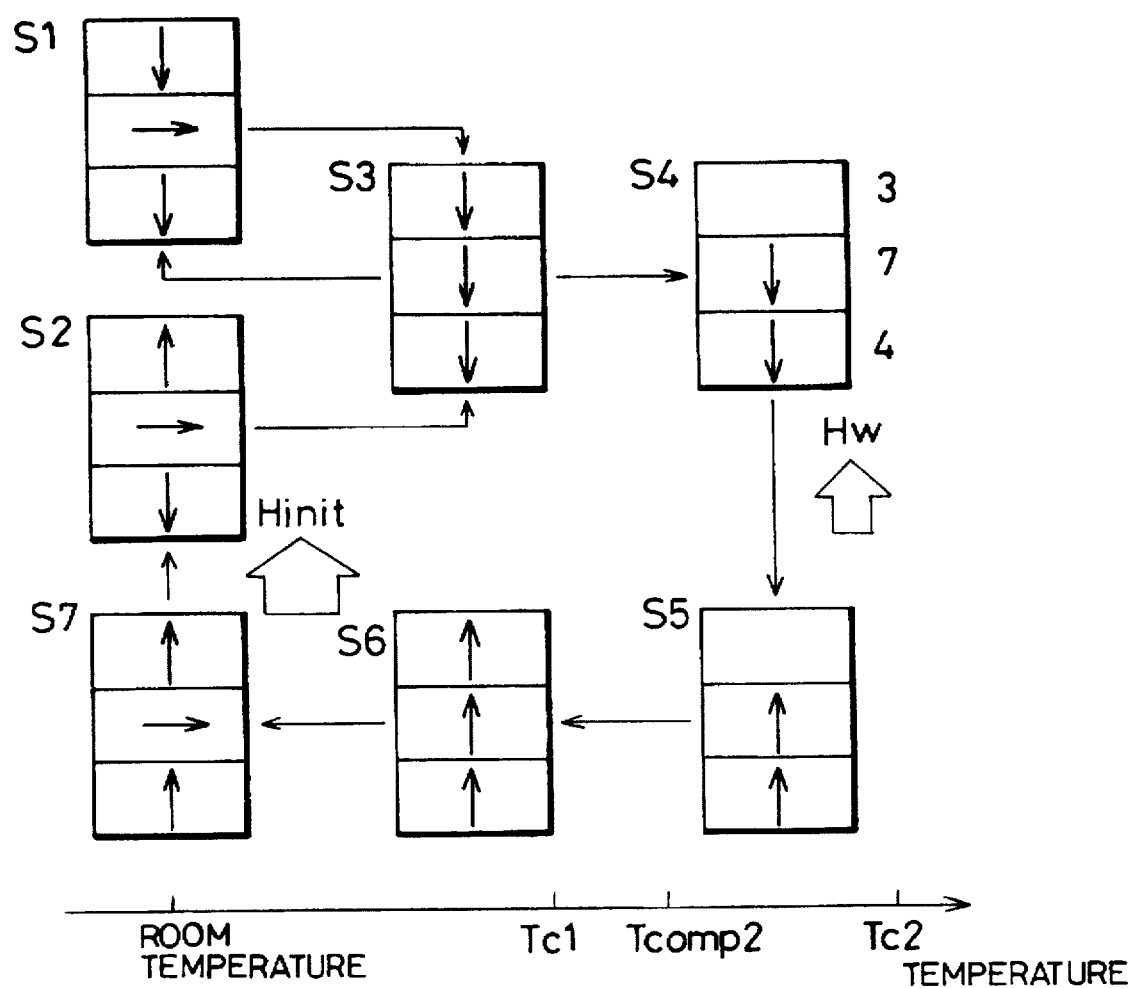
FIG. 8 is a view explaining a process of recording information on the magneto-optical disk shown in FIG. 6.

FIG. 8 shows states of magnetization of the first magnetic layer 3 and the second magnetic layer 4. In FIG. 8, the horizontal axis indicates temperatures. Since these layers are made of rare-earth and transition metal alloys, the total magnetization, the magnetization of the sublattice of the rare-earth metal and the magnetization of the sublattice of the transition metal exist. Arrows show the direction of the magnetization of the sublattice of the transition metal of each of these layers 3 and 4.

When overwriting such a magneto-optical disk 10 by light-intensity modulation, the second magnetic layer 4 is first initialized. Specifically, an upward initializing magnetic field Hinit which is larger than Hc2 but smaller than Hc1 at room temperature is applied to the second magnetic layer 4 so as to align only the direction of the total magnetization of the second magnetic layer 4 in a uniform direction.

Figure 9:
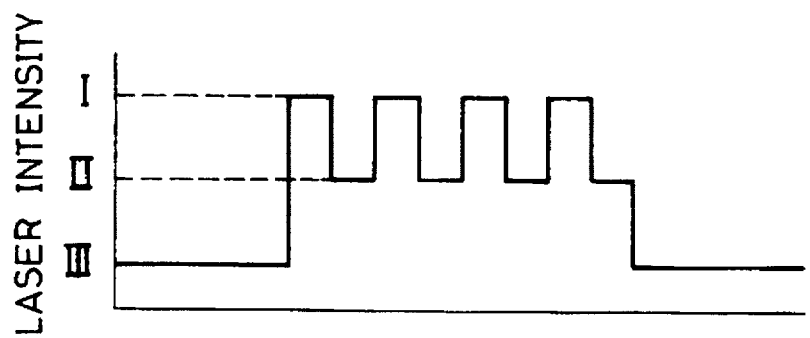
FIG. 9 is a graph showing the intensity of laser light irradiated on the magneto-optical disk shown in FIG. 6.
Figure 10:
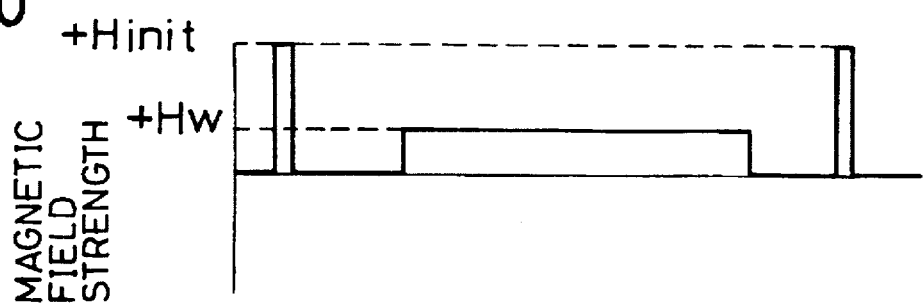
FIG. 10 is a graph showing the strength of a magnetic field applied to the magneto-optical disk shown in FIG. 6.

Additionally, by applying intensity-modulated laser light shown in FIG. 9, Hinit and the recording magnetic field Hw whose direction is the same as Hinit and whose strength is smaller than Hinit (as shown in FIG. 10) to a portion to be irradiated by the laser light, the high process of applying laser light of high level I for raising the temperature of the portion irradiated by the laser light to near Tc2 and the low process of applying laser light of low level II for raising the temperature of the portion irradiated by the laser light to near Tc1 are repeatedly performed. This permits rewriting of information by overwriting.

The two states S1 and S2 are observed at room temperature depending on the direction of magnetization of the first magnetic layer 3. Since the coercive force Hc2 of the second magnetic layer 4 is small at room temperature, the direction of the total magnetization becomes parallel to Hinit. Moreover, since the second magnetic layer 4 has the rare-earth metal rich composition, the direction of the total magnetization becomes opposite to the direction of magnetization of the sublattice of the transition metal. Namely, the direction of the sublattice of magnetization of the transition metal becomes opposite to Hinit.

Since the third magnetic layer 7 has such characteristics that in-plane magnetic anisotropy is larger than perpendicular magnetic anisotropy at room temperature, the magnetization of the second magnetic layer 2 can never be copied to the first magnetic layer 3 through the third magnetic layer 7, thereby preventing the direction of magnetization of the first magnetic layer 3 from being reversed.

In the high process, when the temperature of the portion irradiated by the laser light is raised to near Tc2, the direction of magnetization of the second magnetic layer 4 is switched to be opposite to Hw. In short, the states S1 and S2 change to S5 through S3 and S4.

With a rotation of the magneto-optical disk 10, a different portion of the magneto-optical disk 10 is irradiated by the laser light, and the previously irradiated portion is cooled down. At this time, since the perpendicular magnetic anisotropy is larger than the in-plane magnetic anisotropy in the third magnetic layer 7, the magnetization of the second magnetic layer 4 is copied to the third magnetic layer 7. Then, the magnetization of the third magnetic layer 7 is copied to the first magnetic layer 3, and the magnetization of the sublattice of the first magnetic layer 3 is aligned with the direction of the magnetization of the sublattice of the second magnetic layer 4. Namely, the state S5 changes to S7 through S6.

Furthermore, when Hinit is applied at room temperature, the direction of magnetization of the first magnetic layer 3 with a larger coercive force remains unchanged, while the direction of magnetization of the second magnetic layer 4 of a smaller coercive force is reversed. Namely, the state S7 changes to S2.

In the low process, when the temperature of the portion irradiated by the laser light is raised to near Tc1, the direction of magnetization of the second magnetic layer 4 is not reversed by Hw because the coercive force of the second magnetic layer 4 is larger than Hw.

With a rotation of the magneto-optical disk 10, a different portion of the magneto-optical disk 10 is irradiated by the laser light, and the previously irradiated portion is cooled down. Then, like the above-mentioned process, the magnetization of the sublattice of the first magnetic layer 3 is aligned with the direction of the magnetization of the sublattice of the second magnetic layer 4 by the exchange force exerted on the phase boundary between the first magnetic layer 3 and the second magnetic layer 4. Consequently, the states S1 and S2 change to S1 through S3.

As described above, in the high process, the first magnetic layer 3 moves to the state S2 in which the total magnetization is orientated in the upward direction (i.e., the magnetization of the sublattice of the transition metal is orientated in the upward direction). On the other hand, in the low process, the first magnetic layer 3 moves to the state S1 in which the total magnetization is orientated in the downward direction (i.e., the magnetization of the sublattice of the transition metal is orientated in the downward direction). It is thus possible to carry out overwrite recording by light-intensity modulation.

During reproduction, laser light of level III which is considerably lower than the laser light used for recording is irradiated, and information is reproduced by detecting a rotation of the plane of polarization of the reflected light.

A sample of the second magneto-optical disk 10 is described below. Sample #10 is fabricated by the same method as for the sample #1, and has the first magnetic layer 3 and second magnetic layer 4 which are the same as those used for the sample #1. The third magnetic layer 7 is composed of $Gd_{0.28}(Fe_{0.61}Co_{0.39})_{0.72}$ with a rare-earth metal rich composition, $Tc3 \geq 300°$ C., compensating temperature $Tcomp3=150°$ C., and coercive force $Hc3 \cong 0$ kOe at room temperature. In this third magnetic layer 7, perpendicular magnetic anisotropy becomes larger than in-plane magnetic anisotropy at temperatures about 80° C.

Samples #11 to #17 are the same as the sample #10 except the third magnetic layer 7.

The third magnetic layer 7 of the sample #11 is composed of $Gd_{0.26}(Fe_{0.80}Co_{0.20})_{0.74}$ with a rare-earth metal rich composition, $Tc3 \geq 300°$ C., $Tcomp3=130°$ C. and coercive force $Hc3 \cong 0$ kOe, and shows such a characteristic that perpendicular magnetic anisotropy becomes larger than in-plane magnetic anisotropy at temperatures about 60° C.

The third magnetic layer 7 of the sample #12 is composed of $Gd_{0.26}(Fe_{0.80}Co_{0.20})_{0.74}$ with a rare-earth metal rich composition, $Tc3=290°$ C., $Tcomp3=140°$ C. and coercive force $Hc3 \cong 0$ kOe, and shows such a characteristic that perpendicular magnetic anisotropy becomes larger than in-plane magnetic anisotropy at temperatures about 75° C.

The third magnetic layer 7 of the sample #13 is composed of $Gd_{0.27}(Fe_{0.80}Co_{0.20})_{0.73}$ with a rare-earth metal rich composition, $Tc3 \geq 300°$ C., $Tcomp3=140°$ C. and coercive force $Hc3 \cong 0$ kOe, and shows such a characteristic that perpendicular magnetic anisotropy becomes larger than in-plane magnetic anisotropy at temperatures about 80° C.

The third magnetic layer 7 of the sample #14 is composed of $Gd_{0.28}(Fe_{0.80}Co_{0.20})_{0.72}$ with a rare-earth metal rich composition, $Tc3=280°$ C., $Tcomp3=150°$ C. and coercive force $Hc3 \cong 0$ kOe, and shows such a characteristic that perpendicular magnetic anisotropy becomes larger than in-plane magnetic anisotropy at temperatures about 80° C.

The third magnetic layer 7 of the sample #15 is composed of $Gd_{0.28}(Fe_{0.90}Co_{0.10})_{0.72}$ with a rare-earth metal rich composition, $Tc3=260°$ C., $Tcomp3=150°$ C. and coercive force $Hc3 \cong 0$ kOe, and shows such a characteristic that perpendicular magnetic anisotropy becomes larger than in-plane magnetic anisotropy at temperatures about 80° C.

The third magnetic layer 7 of the sample #16 is composed of $Gd_{0.28}(Fe_{0.65}Co_{0.35})_{0.72}$ with a rare-earth metal rich composition, $Tc3 \geq 300°$ C., $Tcomp3=150°$ C. and coercive force $Hc3 \cong 0$ kOe, and shows such a characteristic that perpendicular magnetic anisotropy becomes larger than in-plane magnetic anisotropy at temperatures about 80° C.

The third magnetic layer 7 of the sample #17 is composed of $Gd_{0.29}(Fe_{0.80}Co_{0.20})_{0.71}$ with a rare-earth metal rich composition, $Tc3=280°$ C., $Tcomp3=170°$ C. and coercive force $Hc3 \cong 0$ kOe, and shows such a characteristic that perpendicular magnetic anisotropy becomes larger than in-plane magnetic anisotropy at temperatures about 120° C.

The third magnetic layer 7 of the sample #18 is the same as the sample #11, except that the film thickness of the third magnetic layer 7 is 30 nm.

With the samples #11 to #18, satisfactory overwriting without old information remaining on the magneto-optical disk 10 was carried out by light-intensity modulation. Additionally, since the film thickness of the third magnetic layer 7 of the sample #18 was made smaller than the film thickness (50 nm) of the third magnetic layer of the sample #11, satisfactory recording was performed even when the duty of recording pulse was decreased to 40%. Considering the fact that the duty of recording pulse of the sample #11 was 60%, the sample #11 has an improved recording sensitivity.

Figure 13:
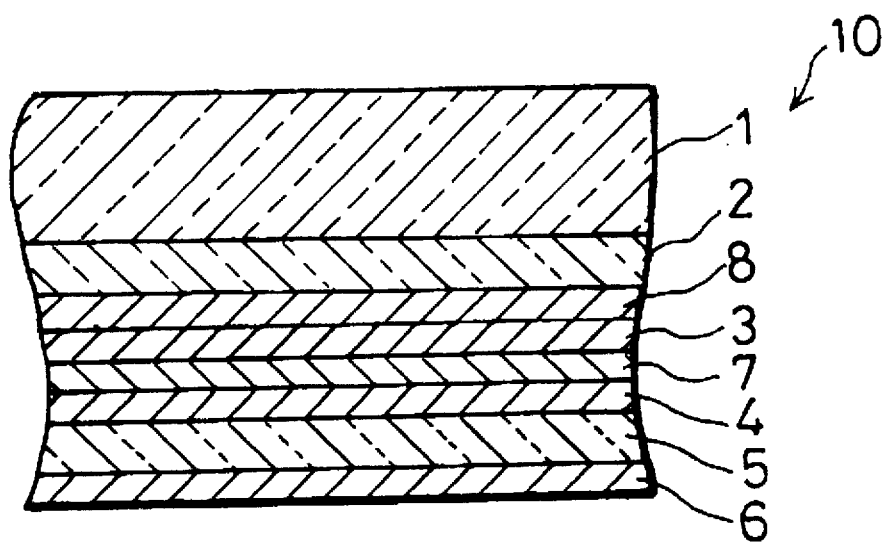
FIG. 13 is a cross section showing a schematic structure of a modified example of the magneto-optical disk.

As illustrated in FIG. 13, a third magneto-optical disk 10 of this embodiment includes the light transmitting substrate 1, the light transmitting transparent dielectric layer 2, a zeroth magnetic layer 8, the first magnetic layer 3, the third magnetic layer 7, the second magnetic layer 4, the protective layer 5 and the overcoat layer 6 laminated in this order. The first magnetic layer 3, the second magnetic layer 4 and the third magnetic layer 7 are made of rare-earth and transition metal alloys.

The zeroth magnetic layer 8 has a Curie temperature Tc0 which is higher than the Curie temperature Tc1 of the first magnetic layer 3, a coercive force Hc0 which is substantially zero at room temperature, and such characteristics that in-plane magnetic anisotropy is larger than perpendicular magnetic anisotropy at room temperature and that perpendicular magnetic anisotropy becomes larger than in-plane magnetic anisotropy at temperatures above a predetermined temperature.

A sample of the third magneto-optical disk 10 is described below. Sample #19 has the zeroth magnetic layer 8 with a film thickness of 50 nm between the transparent dielectric layer 2 and the first magnetic layer 3 of the sample #11, and is fabricated by the same method as for the sample #11.

The zeroth magnetic layer 8 of the sample #19 is composed of $Gd_{0.25}(Fe_{0.80}Co_{0.20})_{0.75}$ with a rare-earth metal rich composition, $Tc0=300°$ C., no compensating temperature, and coercive force $Hc0 \cong 0$ kOe at room temperature, and shows such a characteristic that perpendicular magnetic anisotropy becomes larger than in-plane magnetic anisotropy at temperatures about 100° C.

Recording bits of a recording bit length of 0.65 μm were recorded on and reproduced from the sample #19. The result shows that overwriting by light-intensity modulation was satisfactory without old information remaining on the magneto-optical disk 10, and a satisfactory signal to noise ratio (C/N) of 48 dB was achieved.

Considering the fact that the signal to noise ratio of the sample #11 was 46 dB, the sample #19 has improved signal quality compared with the sample #11. This may have been achieved by a greater Kerr rotation angle which was obtained by establishing the relation Tc0>Tc1.

With the sample #11, when the recording bit length was decreased, C/N was abruptly lowered. Whereas, with sample #19, C/N was not lowered to a large degree. The reason for this would be that since the zeroth magnetic layer 8 exhibits in-plane magnetic anisotropy at room temperature and exhibits perpendicular magnetic anisotropy by the irradiation of laser light of reproduction-use laser power of level III, it is possible to reproduce a short recording bit without having effects from adjacent recording bits.

Glass was used for the substrate 1 for the samples #1 to #19. However, it is also possible to fabricate the substrate 1 using, for example, chemically-reinforced glass, a glass substrate with a so-called 2 P layer which was obtained by forming a layer of ultraviolet hardening resin on such glass, and substrates made of polycarbonate (PC), polyethylmethacrylate (PMMA), amorphouspolyolefine (APO), polystyrene (PS), polychlorobiphenyl (PVC), and epoxy.

Additionally, the film thickness of AlN of the transparent dielectric layer 2 is not restricted to 80 nm. The film thickness of the transparent dielectric layer 2 is determined by considering a so-called Kerr effect enhancement for increasing the polar Kerr rotation angle from the first magnetic layer 3 or the zeroth magnetic layer 8 using the interference effect of light when reproducing information on the magneto-optical disk 10. In order to maximize C/N during reproduction, it is necessary to increase the polar Kerr rotation angle. Hence, the film thickness of the transparent dielectric layer 2 is set so as to obtain the maximum polar Kerr rotation angle.

The film thickness varies depending on the wavelength of the reproduction-use light and the refractive index of the transparent dielectric layer 2. In this embodiment, since the refractive index of AlN is 2.0, when the wavelength of the reproduction-use light is 680 nm, if the film thickness of AlN of the transparent dielectric layer 2 is set in a range between substantially 30 nm and 120 nm, improved Kerr effect enhancement is achieved. More preferably, the film thickness of AlN of the transparent dielectric layer 2 is in a range between 70 nm and 100 nm. When the film thickness of AlN is within this range, the polar Kerr rotation angle becomes substantially maximum.

When the wavelength of the reproduction-use light is 400 nm, the film thickness of the transparent dielectric layer 2 needs to be reduced to a half (400/780). Moreover, if the transparent dielectric layer 2 has a refractive index which is different from the above-mentioned value because of the materials or manufacturing methods used, the film thickness thereof needs to be set so that a value (optical path length) obtained by multiplying the refractive index by a film thickness becomes equal to the above-mentioned value.

As is understood from the above explanation, the film thickness is reduced as the refractive index of the transparent dielectric layer 2 is increased. Furthermore, the larger the refractive index of the transparent dielectric layer 2, the greater the enhancement effect of the polar Kerr rotation angle.

Although the refractive index of AlN is varied by changing the ratio of Ar and $N_2$ in sputtering gas and the gas pressure during sputtering, AlN is a material having a relatively large refractive index of around 1.8 to 2.1 and therefore suitable for the transparent dielectric layer 2. AlN performs not only a function of enhancing the Kerr effect but also a function of preventing the oxidization of the first magnetic layer 3, the second magnetic layer 4, the third magnetic layer 7 and the zeroth magnetic layer 8 as magnetic layers of rare-earth and transition metal alloys as well as of the protective layer 5.

Magnetic films made of rare-earth and transition metal alloys, particularly, rare-earth metal is very easily oxidized. Therefore, if the immersion of oxygen and moisture from outside is not sufficiently blocked, the characteristics of the magnetic films considerably deteriorate. Then, in the samples #1 to #19, the magnetic layers are sandwiched by AlN. AlN is a nitriding film including no oxygen and has a very strong moisture resistance.

Moreover, AlN permits reactive DC (direct current source) sputtering by introducing $N_2$ gas or a mixed gas of Ar and $N_2$ using an Al target, and has the advantage of achieving a higher film forming speed compared with RF (radio frequency) sputtering.

The compositions of DyFeCo, GdFeCo and GdDyFeCo of the respective magnetic layers are not particularly limited to those mentioned above. The same effects are produced by forming the magnetic layers using alloys composed of at least a kind of rare-earth metal selected from Gd, Tb, Dy, Ho and Nd and at least a kind of transition metal selected from Fe and Co.

If at least one element selected from Cr, V, Nb, Mn, Be, Ni, Ti, Pt, Rh and Cu is added to the above material, the magnetic substance has an improved environment resistance. It is thus possible to prevent deterioration of the characteristics of the magnetic layers due to oxidization caused by the immersion of oxygen, achieving a reliable long-life magneto-optical disk.

The film thickness of a magnetic layer varies depending on the material and composition of the magnetic layer. The film thickness of the first magnetic layer 3 is not smaller than 20 nm, and more preferably not smaller than 30 nm. It is desirable to arrange the first magnetic layer 3 to have a film thickness not larger than 100 nm because too large film thickness prevents the information on the second magnetic layer 4 from being copied thereto. The film thickness of the third magnetic layer 7 is not smaller than 5 nm. It is desirable to arrange the third magnetic layer 7 to have a film thickness not larger than 100 nm because too large film thickness prevents the information on the second magnetic layer 4 from being copied thereto. The film thickness of the third magnetic layer 7 is more preferably arranged within a range between 10 nm to 50 nm. The film thickness of the second magnetic layer 4 is not smaller than 20 nm but not larger than 200 nm, and more preferably within a range between 30 nm and 100 nm.

When the Curie temperature Tc1 of the first magnetic layer 3 is lower than 100° C., C/N becomes lower than 45 dB which is the lowest value required for digital recording and reproduction. On the other hand, when Tc1 exceeds 250° C., the recording sensitivity is lowered. Thus, a preferable range for Tc1 is between 100° C. and 250° C. Moreover, when the coercive force Hc1 of the first magnetic layer 3 at room temperature is smaller than 5 kOe, there is a possibility that part of the first magnetic layer 3 is initialized by the initializing magnetic filed Hinit. It is therefore preferable to arrange Hc1 to be not smaller than 5 kOe.

Furthermore, if the Curie temperature Tc3 of the third magnetic layer 7 is lower than Tc1, the magnetization is not satisfactorily copied during overwriting by light-intensity modulation. It is therefore preferable to arrange Tc3 to be not lower than Tc1.

In addition, if the Curie temperature Tc2 of the second magnetic layer 4 is lower than 150° C., overwriting by light-intensity modulation is not satisfactory because the difference between laser power PL of low level II and reproducing laser power PR of level III becomes smaller. Whereas, if Tc2 exceeds 400° C., the recording sensitivity is degraded. It is therefore preferable to set Tc2 in a range between 150° C. and 400° C. Meanwhile, if, the coercive force Hc2 of the second magnetic layer 4 at room temperature exceeds 3 kOe, the size of a device for generating the initializing magnetic field Hinit is increased and thus undesirable. It is therefore suitable to set Hc2 not larger than 3 kOe.

Although AlN of the protective layer 5 has a film thickness of 80 nm in this embodiment, the film thickness is not particularly limited to this value. The preferable range for the film thickness of the protective layer 5 is between 1 nm and 200 nm.

In this embodiment, the total film thickness of the magnetic layers is not smaller than 100 nm. With such a film thickness, light from an optical pickup can hardly be transmitted through the magnetic layers. Hence, the film thickness of the protective layer 5 is not particularly restricted, and can thus be freely set as long as the oxidization of the magnetic layers is prevented for a long time. If a material which has a low ability to prevent oxidization is used, the film thickness needs to be increased. On the other hand, if a material which has a high ability to prevent oxidization is used, the film thickness can be decreased.

The heat conductivity of the protective layer 5 as well as the transparent dielectric layer 2 affects the recording sensitivity of the magneto-optical disk 10. The recording sensitivity means necessary laser power for recording or erasing. Light incident on the magneto-optical disk 10 is almost perfectly transmitted through the transparent dielectric layer 2, absorbed by the magnetic layers as absorbing films, and changed into heat. At this time, the heat of the magnetic layers is conducted to the transparent dielectric layer 2 and the protective layer 5. Thus, the heat conductivity and heat capacity (specific heat) of the transparent dielectric layer 2 and the protective layer 5 affect the recording sensitivity.

In other words, the recording sensitivity of the magneto-optical disk 10 is controlled to some degrees by changing the film thickness of the protective layer 5. For instance, if the recording sensitivity is to be increased (to permit recording and erasing with a low laser power), the film thickness of the protective layer 5 needs to be reduced. In general, a higher recording sensitivity and a smaller film thickness are advantageous in order to increase the life of the laser. Since AlN meets such conditions and has a satisfactory moisture resistance, if it is used as the protective layer 5, it is possible to achieve a smaller film thickness and to provide a magneto-optical disk with high recording sensitivity.

In this embodiment, a magneto-optical disk having a high moisture resistance is provided by using AlN for the protective layer 5 and the transparent dielectric layer 2, and the productivity is improved by forming the protective layer 5 and the transparent dielectric layer 2 using the same material.

Regarding the material for the transparent dielectric layer 2 and the protective layer 5, considering the above-mentioned objectives and effects, SiN, AlSiN, AlTaN, SiAlON, TiN, TiON, BN, ZnS, $TiO_2$, $BaTiO_3$, $SrTiO_3$ as well as AlN are suitable.

In particular, since SiN, AlSiN, AlTaN, TiN, BN and ZnS do not include oxygen, if these materials are used, a magneto-optical disk with satisfactory moisture resistance is provided.

Regarding the material for the cartridge 21, plastic resins such as a polycarbonate resin and an ABS resin are used. However, since a magnet is disposed in a magneto-optical recording medium cartridge of the present invention, it is desirable to add a material for providing a magnetic shield or build a structure functioning as a magnetic shield in order to prevent leakage magnetic field from the cartridge 21.

The following description discusses a second embodiment of the present invention. The members having the same function as in the above-mentioned embodiment will be designated by the same code and their description will be omitted.

A magneto-optical disk (magneto-optical recording medium) 10 of this embodiment includes at least two magnetic layers like the samples #1 to #19.

Figure 14B:
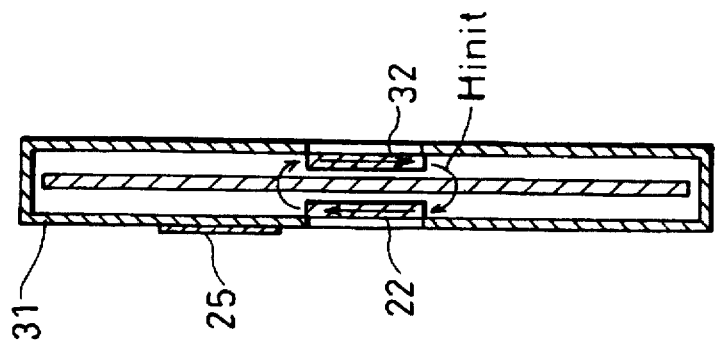
FIGS. 14(a) to 14(c) are views showing a schematic structure of a magneto-optical disk cartridge according to another embodiment of the present invention, FIG. 14(a) being a plan view, FIGS. 14(b) and 14(c) showing cross sections.
Figure 14A:
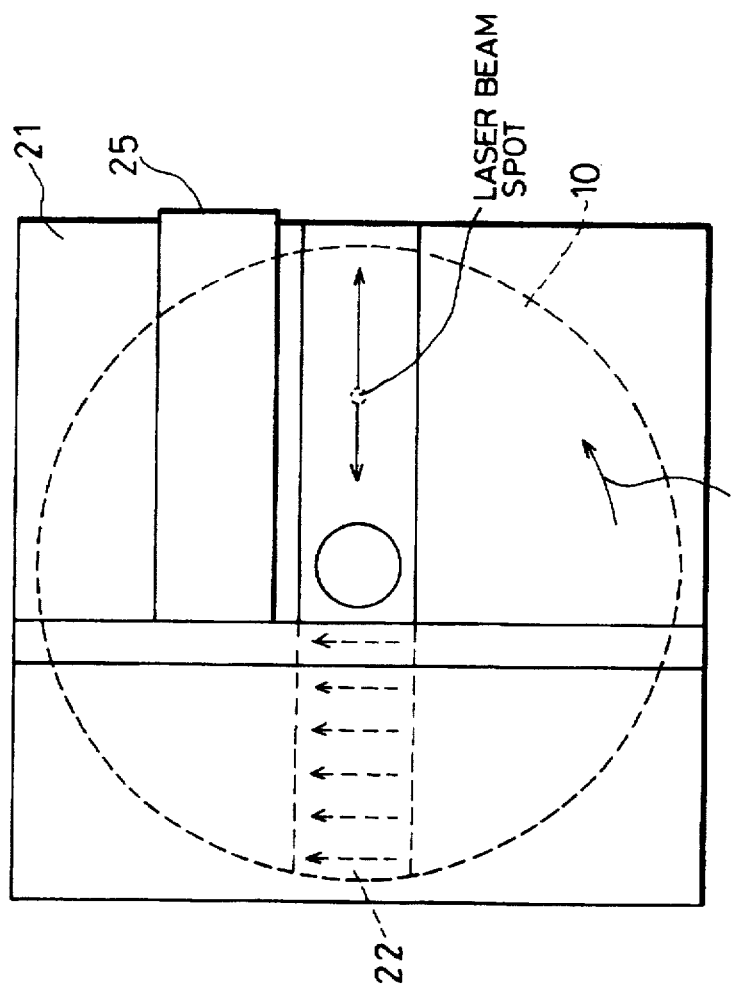
Figure 14C:
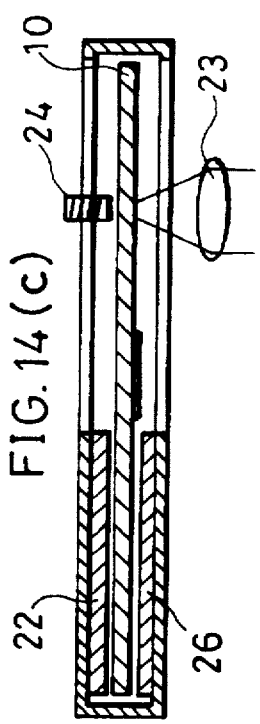

As illustrated in FIGS. 14(a) to 14(c), a magneto-optical disk cartridge (magneto-optical recording medium cartridge) 31 of this embodiment contains the magneto-optical disk 10. The magnet 22 and a magnet 32 are included in the magneto-optical disk cartridge 31, and located in opposite positions so that the magneto-optical disk 10 is positioned therebetween. The magnets 22 and 32 are magnetized in parallel with the magneto-optical disk 10. The direction of magnetization of the magnet 22 and that of the magnet 32 are opposite to each other as shown in the cross section of FIG. 14(b). The magnets 22 and 32 generate magnetic fields whose directions are substantially perpendicular to a surface of the magneto-optical disk 10 in a section where the magneto-optical disk is stored.

Information was recorded on and reproduced from the sample #1 of the magneto-optical disk 10 using the magneto-optical disk cartridge 31 under the conditions where laser power PH of high level I was 10 mW, laser power PL of low level II was 2 mW, reproducing laser power PR of level III was 1 mW, a recording bit length was 0.65 µm and recording magnetic field, Hw was 400 (Oe). The result shows that overwriting by light-intensity modulation was satisfactory without old information remaining on the magneto-optical disk 10, and a satisfactory signal to noise ratio (C/N) of 46 dB was achieved.

The samples #1 to #19 of the magneto-optical disks 10 are generally called single-sided magneto-optical disks. Referring to thin films of the transparent dielectric layer, magnetic layers and protective layer as a recording medium layer, a single-sided magneto-optical disk is constructed by the substrate 1, the recording medium layer and the overcoat layer 6.

On the other hand, a so-called double-sided magneto-optical disk is formed by bonding two substrates 1 which have thereon a recording medium layer and placed so that the recording medium layers face each other using a bonding layer (not shown). A polyurethane acrylate series bonding agent is a particularly suitable material for the bonding layer. This bonding agent performs three types of (ultraviolet rays, heat and anaerobic) hardening functions. One of the advantages of such a bonding agent is that a shaded portion of the recording medium through which ultraviolet rays are not transmitted is hardened by the heat and anaerobic hardening functions. Moreover, since the bonding agent has a significantly high moisture resistance, it is possible to provide a magneto-optical disk which is highly stable for a long time. The single-sided magneto-optical disk is suitable for use in, for example, a compact recording and reproducing device because the thickness of the element is a half of that of the double-sided magneto-optical disk. Additionally, since the double-sided magneto-optical disk allows reproduction of information from both sides thereof, it is suitable for use in, for example, a high-capacity recording and reproducing device. The magneto-optical recording medium cartridge 31 of this embodiment is also effectively used for containing such a double-sided magneto-optical disk.

The magnets 22 and 32 are Nd series permanent magnets of 1.21 T (tesla). The dimensions of each of the magnets 22 and 32 are 24 mm (width in a radial direction of the magneto-optical disk 10)×1 mm (height)×10 mm (length in a rotating direction of the magneto-optical disk 10). The actual distance (hereinafter referred to as gap) between each magnet and the magneto-optical disk 10 is 1 mm. The magneto-optical disk 10 is initialized just above the magnets 22 and 32 by magnetic fields (initializing magnetic fields) of the magnets 22 and 32. The magnetic fields Hinit generated just above the magnets 22 and 32 were not smaller than 2.5 kOe.

The reason why the magnets of this embodiment have a thickness smaller than that of the magnet in the first embodiment is as follows. Since two magnets having magnetization of opposite directions when seen from the cross sections thereof are provided, the line of magnetic force draws a loop as shown in FIG. 14(b) and thus the magnetic fields of the magnets 22 and 32 are increased.

In addition, since the line of magnetic force draws a loop, the perpendicular components of the magnetic fields of the magnet 22 and magnet 32 are easily obtained, thereby permitting smooth overwriting by light-intensity modulation. Furthermore, since the line of magnetic force draws a loop, it is possible to reduce the leakage magnetic field from the magneto-optical disk cartridge 31.

When the magnets 22 and 32 were permanent magnets of 1.21 T and had dimensions (width×height×length) and a gap shown in Table 2, overwriting by light-intensity modulation was satisfactory without old information remaining on the magneto-optical disk 10, and a satisfactory signal to noise ratio (C/N) of 46 dB was achieved.

TABLE 2

| Width | Height | Length | (unit: mm) Gap |
|---|---|---|---|
| 20 | 1 | 24 | 0.5 |
| 20 | 0.5 | 24 | 0.5 |
| 20 | 0.5 | 24 | 1.0 |
| 20 | 1 | 26 | 0.5 |
| 20 | 1 | 26 | 1.0 |
| 20 | 0.5 | 26 | 0.5 |
| 20 | 0.5 | 26 | 1.0 |
| 24 | 1 | 24 | 0.5 |
| 24 | 1 | 24 | 1.0 |
| 24 | 0.5 | 24 | 0.5 |
| 24 | 0.5 | 24 | 1.0 |
| 27 | 1 | 27 | 0.5 |
| 27 | 1 | 27 | 1.0 |
| 27 | 0.5 | 27 | 0.5 |
| 27 | 0.5 | 27 | 1.0 |
| 24 | 1 | 10 | 0.5 |
| 24 | 0.8 | 10 | 0.5 |
| 24 | 0.6 | 10 | 0.4 |
| 24 | 0.5 | 10 | 0.3 |
| 27 | 0.7 | 10 | 0.5 |
| 27 | 0.6 | 10 | 0.4 |
| 27 | 0.4 | 10 | 0.3 |

The following description discusses a third embodiment of the present invention. The members having the same function as in the above-mentioned embodiment will be designated by the same code and their description will be omitted.

A magneto-optical disk (magneto-optical recording medium) 10 of this embodiment includes at least two magnetic layers like the samples #1 to #19.

Figure 15B:
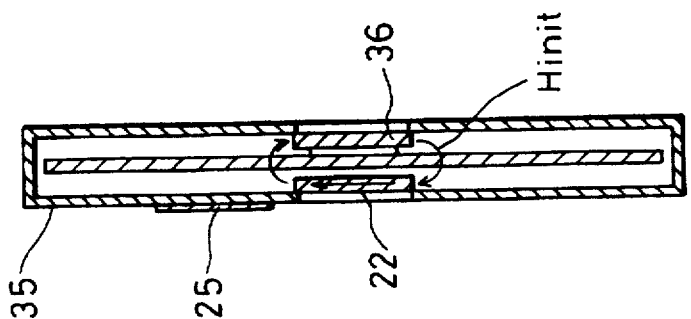
FIGS. 15(a) to 15(c) are views showing a schematic structure of a magneto-optical disk cartridge according to still another embodiment of the present invention, FIG. 15(a) being a plan view, FIGS. 15(b) and 15(c) showing cross sections.
Figure 15A:
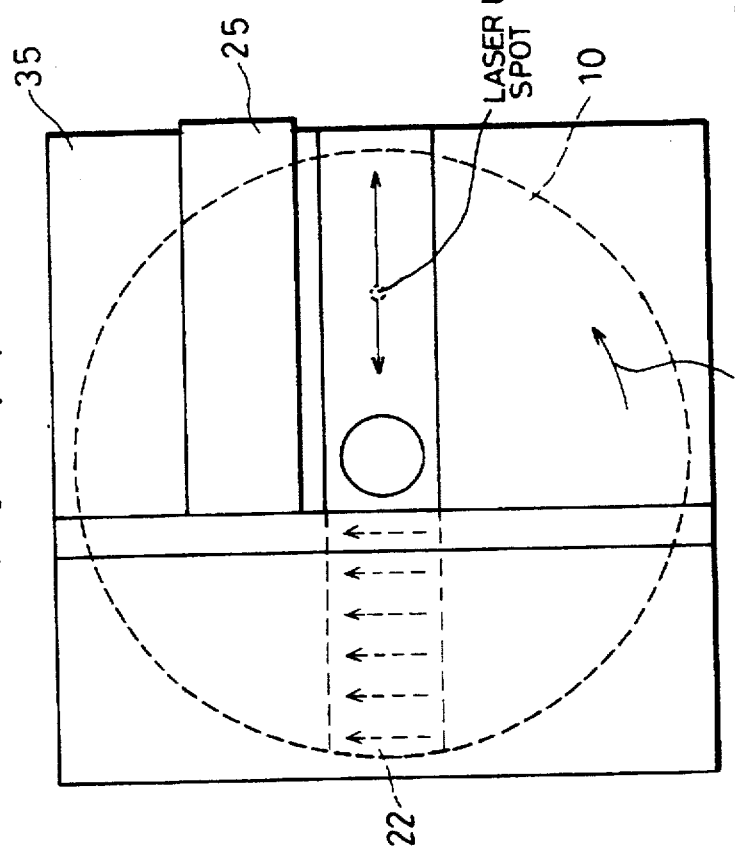
Figure 15C:
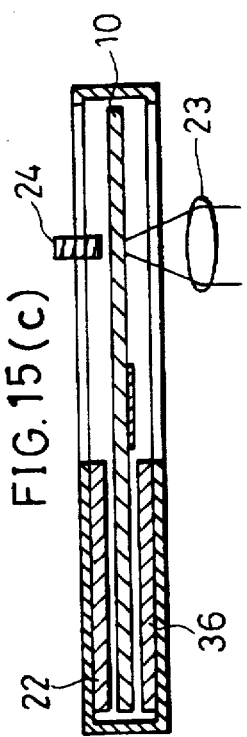

As illustrated in FIGS. 15(a) to 15(c), a magneto-optical disk cartridge (magneto-optical recording medium cartridge) 35 of this embodiment contains the magneto-optical disk 10. The magnet 22 is included in the magneto-optical disk cartridge 35, and magnetized in parallel with the magneto-optical disk 10. A yoke 36 is made of soft magnetic material and is disposed in a position opposite to the magnet 22. The magnet 22 generates magnetic fields whose directions are substantially perpendicular to the surface of the magneto-optical disk 10.

Information was recorded on and reproduced from the sample #1 of the magneto-optical disk 10 using the magneto-optical disk cartridge 35 under the conditions where laser power PH of high level I was 10 mW, laser power PL of low level II was 2 mW, reproducing laser power PR of level III was 1 mW, a recording bit length was 0.65 μm and recording magnetic field Hw was 400 (Oe). The result shows that overwriting by light-intensity modulation was satisfactory without old information remaining on the magneto-optical disk 10, and a satisfactory signal to noise ratio (C/N) of 46 dB was achieved.

The magnet 22 is an Nd series permanent magnet of 1.21 T (tesla). The dimensions of the magnet 22 are 24 mm (width in a radial direction of the magneto-optical disk 10)×1.6 mm (height)×10 mm (length in a rotating direction of the magneto-optical disk 10). The actual distance (hereinafter referred to as gap) between the magnet 22 and the magneto-optical disk 10 is 1 nm.

The yoke 36 is a soft magnetic material composed of Sendust, and has dimensions, 24 mm (width in a radial direction of the magneto-optical disk 10)×1 mm (height) ×10 mm (length in a rotating direction of the magneto-optical disk 10).

The magneto-optical disk 10 is initialized just above the magnet 22 by magnetic fields (initializing magnetic fields) of the magnet 22. The magnetic fields Hinit generated just above the magnet 22 were not smaller than 2.5 kOe.

As described above, when the yoke 36 is provided, since the line of magnetic force draws a loop as shown in FIG. 15(b), the perpendicular components of the magnetic fields of the magnet 22 are easily obtained, thereby permitting smooth overwriting by light-intensity modulation. Moreover, since the line of magnetic force draws a loop, it is possible to reduce the leakage magnetic field from the magneto-optical disk cartridge 35.

When the magnet 22 was a permanent magnet of 1.21 T and had dimensions (width×height×length) and a gap shown in Table 3, overwriting by light-intensity modulation was satisfactory without old information remaining on the magneto-optical disk 10, and a satisfactory signal to noise ratio (C/N) of 46 dB was achieved.

TABLE 3

| Width | Height | Length | (unit: mm) Gap |
|---|---|---|---|
| 20 | 1.6 | 24 | 0.5 |
| 20 | 0.8 | 24 | 0.5 |
| 20 | 0.8 | 24 | 1.0 |
| 20 | 1.6 | 26 | 0.5 |
| 20 | 1.6 | 26 | 1.0 |
| 20 | 0.8 | 26 | 0.5 |
| 20 | 0.8 | 26 | 1.0 |
| 24 | 1.6 | 24 | 0.5 |
| 24 | 1.6 | 24 | 1.0 |
| 24 | 0.8 | 24 | 0.5 |
| 24 | 0.8 | 24 | 1.0 |
| 27 | 1.6 | 27 | 0.5 |
| 27 | 1.6 | 27 | 1.0 |
| 27 | 0.8 | 27 | 0.5 |
| 27 | 0.8 | 27 | 1.0 |
| 24 | 1.6 | 10 | 0.5 |
| 24 | 1.3 | 10 | 0.5 |
| 24 | 1.0 | 10 | 0.4 |
| 24 | 0.8 | 10 | 0.3 |
| 27 | 1.1 | 10 | 0.5 |
| 27 | 1.0 | 10 | 0.4 |
| 27 | 0.7 | 10 | 0.3 |

The following description discusses a fourth embodiment of the present invention. The members having the same function as in the above-mentioned embodiment will be designated by the same code and their description will be omitted.

A magneto-optical disk (magneto-optical recording medium) 10 of this embodiment includes at least two magnetic layers like the samples #10 to #19.

As illustrated in FIGS. 16(a) to 16(c), a magneto-optical disk cartridge (magneto-optical recording medium cartridge) 40 of this embodiment contains the magneto-optical disk 10. The magnet 22 is included in the magnetooptical disk cartridge 40, and located in a position (a lower position in FIG. 16(a)) which is separated from a laser beam spot by a predetermined distance. The magnet 22 is magnetized in parallel with the magneto-optical disk 10.

Since the magnet 22 is disposed in the vicinity of the laser beam spot, it generates magnetic fields whose directions are substantially perpendicular to the surface of the magneto-optical disk 10 in a section where the magneto-optical disk 10 is stored, more specifically, in an incident position of the light beam and in the vicinity thereof. Among those magnetic fields, a magnetic field generated in the vicinity of the incident position of the light beam functions as a magnetic field for initializing the magneto-optical disk 10 (initializing magnetic field), while a magnetic field generated in the incident position of the light beam functions as a magnetic field for recording (recording magnetic field).

Information was recorded on and reproduced from the sample #10 of the magneto-optical disk 10 using the magneto-optical disk cartridge 40 under the conditions where laser power PH of high level I was 10 mW, laser power PL of low level II was 2 mW, reproducing laser power PR of level III was 1 mW, a recording bit length was 0.65 μm. The result shows that overwriting by light-intensity modulation was satisfactory without old information remaining on the magneto-optical disk 10, and a satisfactory signal to noise ratio (C/N) of 46 dB was achieved.

The magnet 22 is an Nd series permanent magnet of 1.21 T (tesla). The dimensions of the magnet 22 are 24 mm (width in a radial direction of the magneto-optical disk 10)×2 mm (height)×10 mm (length in a rotating direction of the magneto-optical disk 10). The actual distance (hereinafter referred to as gap) between the magnet 22 and the magneto-optical disk 10 is 1 mm.

The magneto-optical disk 10 is initialized just above the magnet 22 by the magnetic fields (initializing magnetic fields) of the magnet 22, and information is recorded by the magnetic fields (recording magnetic fields) of the magnet 22 at the position of the laser beam spot converged by the objective lens 23. The magnetic fields Hinit generated just above the magnet 22 was not smaller than 2.5 kOe, and the recording magnetic fields Hw generated at the position of the laser beam spot was equal to 400 (Oe).

In this case, the first magnetic layer 3 exhibits a transition metal rich characteristic in a temperature range between room temperature and the Curie temperature. The second magnetic layer 4 has a compensating temperature, and exhibits a rare-earth metal rich characteristic in a temperature range between room temperature and the compensating temperature and a transition metal rich characteristic in a temperature range between the compensating temperature and the Curie temperature. At this time, since the direction of the initializing magnetic field Hinit and that of the recording magnetic field Hw are equal to each other, overwriting by light-intensity modulation is carried out by performing recording at a position which is separated from the laser light spot by the predetermined distance just after the portion of the magneto-optical disk 10 on which information is to be recorded passes through the magnet 22.

Additionally, when the first magnetic layer 3 exhibits a transition metal rich characteristic in a temperature range between room temperature and the Curie temperature and when the second magnetic layer 4 does not have a compensating temperature and exhibits a rare-earth metal rich characteristic in a temperature range between room temperature and the Curie temperature, the direction of the initializing magnetic field Hinit and that of the recording magnetic field Hw differ from each other. In this case, as illustrated in FIGS. 17(a) to 17(c), the magneto-optical disk 10 is rotated in a reverse direction, and overwriting by light-intensity modulation is carried out by performing recording at a position which is separated from the laser light spot by the predetermined distance just before the recorded portion of the magneto-optical disk 10 passes through the magnet 22. It is also possible to dispose the magnet 22 in a location (upper position in FIG. 17(a)) above the position of the laser beam spot and rotate the magneto-optical disk in the rotating direction shown in FIG. 16(a).

When the magnet 22 was a permanent magnet of 1.21 T and had dimensions (width×height×length) and a gap shown in Table 4, overwriting by light-intensity modulation was satisfactory without old information remaining on the magneto-optical disk 10, and a satisfactory signal to noise ratio (C/N) of 46 dB was achieved. In this embodiment, since the magnet 22 generates not only the initializing magnetic field but also the recording magnetic field, there is no need to include a member for generating a recording magnetic field in a magneto-optical recording device, thereby enabling a reduction in the size of the magneto-optical recording device.

Furthermore, unlike the case where a magnet is included in the magneto-optical recording device, a suitable magnet for generating magnetic fields of appropriate strength can be selected for each magneto-optical disk while considering the coercive force of each magnetic layer of the magneto-optical disk. It is therefore possible to deal with magneto-optical disks with varied characteristics using a single magneto-optical recording device. Consequently, the magneto-optical recording device is used for various purposes.

TABLE 4

| Width | Height | Length | Gap | (unit: mm) Distance |
|---|---|---|---|---|
| 20 | 2 | 24 | 0.5 | 2–6 |
| 20 | 1 | 24 | 0.5 | 2–6 |
| 20 | 1 | 24 | 1.0 | 2–3 |
| 20 | 2 | 26 | 0.5 | 2–4 |
| 20 | 2 | 26 | 1.0 | 2–5 |
| 20 | 1 | 26 | 0.5 | 2–6 |
| 20 | 1 | 26 | 1.0 | 2–3 |
| 24 | 2 | 24 | 0.5 | 2–4 |
| 24 | 2 | 24 | 1.0 | 2–5 |
| 24 | 1 | 24 | 0.5 | 2–6 |
| 24 | 1 | 24 | 1.0 | 2–3 |
| 27 | 2 | 27 | 0.5 | 2–4 |
| 27 | 2 | 27 | 1.0 | 2–5 |
| 27 | 1 | 27 | 0.5 | 2–6 |
| 27 | 1 | 27 | 1.0 | 2–3 |
| 24 | 2 | 10 | 0.5 | 2–4 |
| 24 | 1.5 | 10 | 0.5 | about 3 |
| 24 | 1.2 | 10 | 0.4 | about 2.5 |
| 24 | 0.9 | 10 | 0.3 | about 1.5 |
| 27 | 1.4 | 10 | 0.5 | about 2.5 |
| 27 | 1.1 | 10 | 0.4 | about 2 |
| 27 | 0.8 | 10 | 0.3 | about 1.5 |

The samples #10 to #19 are used as the magneto-optical disk 10 in this embodiment. However, it is also possible to use a magneto-optical disk having the two-layer structure like the samples #1 to #9 if the first magnetic layer 3 shows a transition metal rich characteristic in a temperature range between room temperature and the Curie temperature and if the second magnetic layer 4 has a compensating temperature and exhibits a rare-earth metal rich characteristic in a temperature range between room temperature and the compensating temperature and a transition metal rich characteristic in a temperature range between the compensating temperature and the Curie temperature.

The following description discusses a fifth embodiment of the present invention. The members having the same function as in the above-mentioned embodiment will be designated by the same code and their description will be omitted.

A magneto-optical disk (magneto-optical recording medium) 10 of this embodiment includes at least two magnetic layers like the samples #10 to #19 of the above-mentioned embodiments.

Figure 18B:
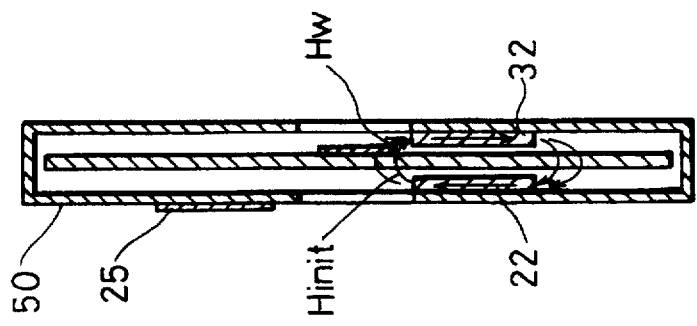
FIGS. 18(a) to 18(c) are views showing a schematic structure of a magneto-optical disk cartridge according to still another embodiment of the present invention, FIG. 18(a) being a plan view, FIGS. 18(b) and 18(c) showing cross sections.
Figure 18A:
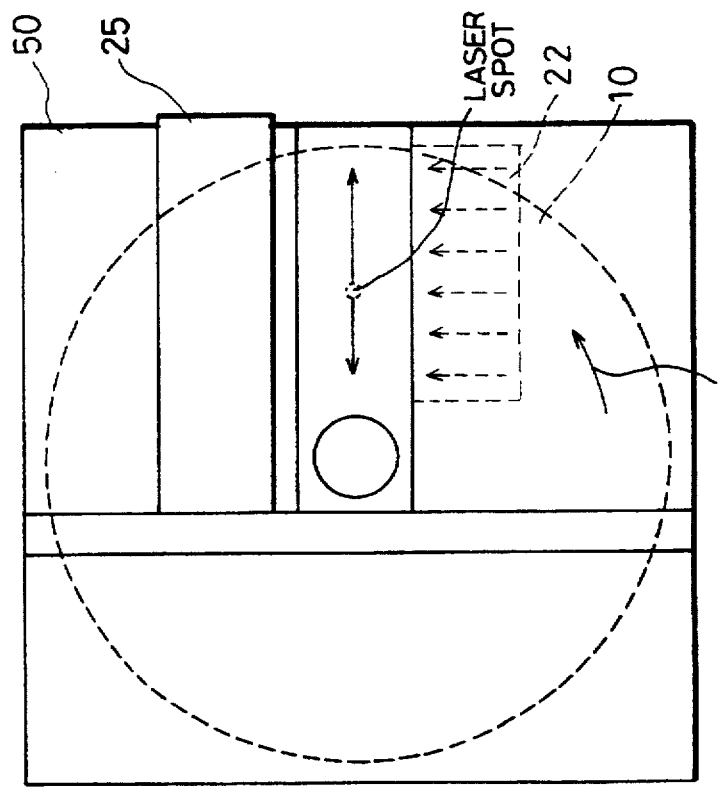
Figure 18C:
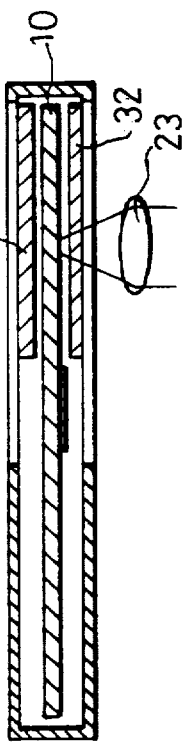

As illustrated in FIGS. 18(a) to 18(c), a magneto-optical disk cartridge (magneto-optical recording medium cartridge) 50 of this embodiment contains the magneto-optical disk 10. The magnets 22 and 32 are included in the magneto-optical disk cartridge 50 so that they are located in opposite positions (lower positions in FIG. 18(a)) which are separated from a laser beam spot by a predetermined distance so that the magneto-optical disk 10 is placed therebetween.

The magnets 22 and 32 are magnetized in parallel with the magneto-optical disk 10 so that the direction of magnetization of the magnet 22 and that of the magnet 32 become opposite to each other. The magnets 22 and 32 generate magnetic fields whose directions are uniform and substantially perpendicular to the surface of the magneto-optical disk 10 in a section where the magneto-optical disk 10 is stored, more specifically, in an incident position of the light beam and in the vicinity thereof. Among those magnetic fields, a magnetic field generated in the vicinity of the incident position of the light beam functions as a magnetic field for initializing the magneto-optical disk 10 (initializing magnetic field), while a magnetic field generated in the incident position of the light beam functions as a magnetic field for recording (recording magnetic field).

Information was recorded on and reproduced from the sample #10 of the magneto-optical disk 10 using the magneto-optical disk cartridge 50 under the conditions where laser power PH of high level I was 10 mW, laser power PL of low level II was 2 mW, reproducing laser power PR of level III was 1 mW, and a recording bit length was 0.65 μm. The result shows that overwriting by light-intensity modulation was satisfactory without old information remaining on the magneto-optical disk 10, and a satisfactory signal to noise ratio (C/N) of 46 dB was achieved.

The magnets 22 and 32 are Nd series permanent magnets of 1.21 T (tesla). The dimensions of each of the magnets 22 and 32 are 24 mm (width in a radial direction of the magneto-optical disk 10)×1 mm (height)×10 mm (length in a rotating direction of the magneto-optical disk 10). The actual distance (hereinafter referred to as gap) between each magnets 22 and 32 and the magneto-optical disk 10 is 1 mm.

The magneto-optical disk 10 is initialized just above the magnets 22 and 32 by the magnetic fields (initializing magnetic fields) of the magnets 22 and 32, and recording is performed by the magnetic fields (recording magnetic fields) of the magnets 22 and 32 at the position of the laser beam spot converged by the objective lens 23. The magnetic field Hinit generated just above the magnets 22 and 32 was not smaller than 2.5 kOe, and the recording magnetic field Hw generated at the position of the laser beam spot was equal to 400 (Oe).

The reason why the magnets of this embodiment have a thickness smaller than that of the magnet in the first embodiment is as follows. Similarly to the second embodiment, since two magnets having magnetization of opposite directions when seen from the cross sections thereof are provided, the line of magnetic force draws a loop as shown in FIG. 18(b) and thus the magnetic fields of the magnets 22 and 32 are increased.

In addition, since the line of magnetic force draws a loop, the perpendicular components of the magnetic fields of the magnets 22 and 32 are easily obtained, thereby permitting smooth overwriting by light-intensity modulation. Furthermore, since the line of magnetic force draws a loop, it is possible to reduce the leakage magnetic field from the magneto-optical disk cartridge 50.

Like the fourth embodiment, the first magnetic layer 3 exhibits a transition metal rich characteristic in a temperature range between room temperature and the Curie temperature. The second magnetic layer 4 has a compensating temperature, and exhibits a rare-earth metal rich characteristic in a temperature range between room temperature and the compensating temperature and a transition metal rich characteristic in a temperature range between the compensating temperature and the Curie temperature. At this time, since the direction of the initializing magnetic field Hinit and that of the recording magnetic field Hw are equal to each other, overwriting by light-intensity modulation is carried out by performing recording at a position which is separated from the laser light spot by the predetermined distance just after the recorded portion of the magneto-optical disk 10 passes through the magnet 22.

Additionally, when the first magnetic layer 3 exhibits a transition metal rich characteristic in a temperature range between room temperature and the Curie temperature and when the second magnetic layer 4 does not have a compensating temperature and exhibits a rare-earth metal rich characteristic in a temperature range between room temperature and the Curie temperature, the direction of the initializing magnetic field Hinit and that of the recording magnetic field Hw differ from each other. In this case, overwriting by light-intensity modulation is carried out by rotating the magneto-optical disk 10 in a reverse direction and performing recording at a position which is separated from the laser light spot by the predetermined distance just before the recorded portion of the magneto-optical disk 10 passes through the magnet 22. It is also possible to dispose the magnet 22 in a position (upper position in FIG. 18(a)) above the position of the laser beam spot and rotate the magneto-optical disk 10 in the rotating direction shown in FIG. 18(a).

When the magnets 22 and 32 were permanent magnets of 1.21 T and had dimensions (width×height×length) and a gap shown in Table 5, overwriting by light-intensity modulation was satisfactory without old information remaining on the magneto-optical disk 10, and a satisfactory signal to noise ratio (C/N) of 46 dB was achieved. In this embodiment, since the magnet 22 generates not only the initializing magnetic field but also the recording magnetic field, there is no need to include a member for generating a recording magnetic field in a magneto-optical recording device, thereby enabling a reduction in the size of the magneto-optical recording device.

TABLE 5

| Width | Height | Length | Gap | (unit: mm) Distance |
|---|---|---|---|---|
| 20 | 1 | 24 | 0.5 | 2–6 |
| 20 | 0.5 | 24 | 0.5 | 2–6 |
| 20 | 0.5 | 24 | 1.0 | 2–3 |
| 20 | 1 | 26 | 0.5 | 2–4 |
| 20 | 1 | 26 | 1.0 | 2–5 |
| 20 | 0.5 | 26 | 0.5 | 2–6 |
| 20 | 0.5 | 26 | 1.0 | 2–3 |

TABLE 5-continued

| Width | Height | Length | Gap | (unit: mm) Distance |
|---|---|---|---|---|
| 24 | 1 | 24 | 0.5 | 2–4 |
| 24 | 1 | 24 | 1.0 | 2–5 |
| 24 | 0.5 | 24 | 0.5 | 3–6 |
| 24 | 0.5 | 24 | 1.0 | 2–3 |
| 27 | 1 | 27 | 0.5 | 2–4 |
| 27 | 1 | 27 | 1.0 | 2–5 |
| 27 | 0.5 | 27 | 0.5 | 3–6 |
| 27 | 0.5 | 27 | 1.0 | 2–3 |
| 24 | 1 | 10 | 0.5 | 2–4 |
| 24 | 0.8 | 10 | 0.5 | about 3 |
| 24 | 0.6 | 10 | 0.4 | about 2.5 |
| 24 | 0.5 | 10 | 0.3 | about 1.5 |
| 27 | 0.7 | 10 | 0.5 | about 2.5 |
| 27 | 0.6 | 10 | 0.4 | about 2 |
| 27 | 0.4 | 10 | 0.3 | about 1.5 |

The samples #10 to #19 in the above-mentioned embodiments are used as the magneto-optical disk 10 in this embodiment. However, it is also possible to use a magneto-optical disk having the two-layer structure like the samples #1 to #9 if the first magnetic layer 3 shows a transition metal rich characteristic in a temperature range between room temperature and the Curie temperature and if the second magnetic layer 4 has a compensating temperature and exhibits a rare-earth metal rich characteristic in a temperature range between room temperature and the compensating temperature and a transition metal rich characteristic in a temperature range between the compensating temperature and the Curie temperature.

The following description discusses a sixth embodiment of the present invention. The members having the same function as in the above-mentioned embodiment will be designated by the same code and their description will be omitted.

A magneto-optical disk (magneto-optical recording medium) 10 of this embodiment includes at least two magnetic layers like the samples #10 to #19.

As illustrated in FIGS. 19(a) to 19(c), a magneto-optical disk cartridge (magneto-optical recording medium cartridge) 60 of this embodiment contains the magneto-optical disk 10. The magnet 22 is included in the magneto-optical disk cartridge 60. The yoke 36 made of a soft magnetic material is disposed in a position opposite to the magnet 22 so that the magneto-optical disk 10 is placed therebetween. The magnet 22 and the yoke 36 are disposed in lower positions in FIG. 19(a) and separated from a laser beam spot by a predetermined distance.

The magnet 22 is magnetized in parallel with the magneto-optical disk 10. The magnets 22 and 32 generate magnetic fields whose directions are uniform and substantially perpendicular to the surface of the magneto-optical disk 10 in a section where the magneto-optical disk 10 is stored, more specifically, in an incident position of the light beam and in the vicinity thereof. Among those magnetic fields, a magnetic field generated in the vicinity of the incident position of the light beam functions as a magnetic field for initializing the magneto-optical disk 10 (initializing magnetic field), while a magnetic field generated in the incident position of the light beam functions as a magnetic field for recording (recording magnetic field).

Information was recorded on and reproduced from the sample #10 of the magneto-optical disk 10 using the magneto-optical disk cartridge 60 under the conditions where laser power PH of high level I was 10 mW, laser power PL of low level II was 2 mW, reproducing laser power PR of level III was 1 mW, and a recording bit length was 0.65 μm. The result shows that overwriting by light-intensity modulation was satisfactory without old information remaining on the magneto-optical disk 10, and a satisfactory signal to noise ratio (C/N) of 46 dB was achieved.

The magnets 22 is an Nd series permanent magnet of 1.21 T (tesla). The dimensions of the magnet 22 are 24 mm (width in a radial direction of the magneto-optical disk 10)×1.6 mm (height)×10 mm (length in a rotating direction of the magneto-optical disk 10). The actual distance (hereinafter referred to as gap) between the magnet 22 and the magneto-optical disk 10 is 1 mm.

The yoke 36 is a soft magnetic material composed of Sendust, and has dimensions, 24 mm (width in a radial direction of the magneto-optical disk 10)×1 mm (height) ×10 mm (length in a rotating direction of the magneto-optical disk 10).

The magneto-optical disk 10 is initialized just above the magnet 22 by the magnetic field (initializing magnetic fields) of the magnet 22, and recording is executed by the magnetic field (recording magnetic field) of the magnet 22 at the position of the laser beam spot converged by the objective lens 23. The magnetic field Hinit generated just above the magnet 22 and the yoke 36 was not smaller than 2.5 kOe, and the recording magnetic field Hw generated at the position of the laser beam spot was equal to 400 (Oe).

As described above, when the yoke 36 is provided, since the line of magnetic force draws a loop, the perpendicular components of the magnetic fields of the magnet 22 are more easily obtained than in the first embodiment, thereby permitting smooth overwriting by light-intensity modulation. Moreover, since the line of magnetic force draws a loop, it is possible to reduce the leakage magnetic field from the magneto-optical disk cartridge 60.

Like the fourth embodiment, the first magnetic layer 3 exhibits a transition metal rich characteristic in a temperature range between room temperature and the Curie temperature. The second magnetic layer 4 has a compensating temperature, and exhibits a rare-earth metal rich characteristic in a temperature range between room temperature and the compensating temperature and a transition metal rich characteristic in a temperature range between the compensating temperature and the Curie temperature. At this time, since the direction of the initializing magnetic field Hinit and that of the recording magnetic field Hw are equal to each other, overwriting by light-intensity modulation is carried out by performing recording at a position which is separated from the laser light spot by the predetermined distance just after the recorded portion of the magneto-optical disk 10 passes through the magnet 22.

Additionally, when the first magnetic layer 3 exhibits a transition metal rich characteristic in the temperature range between room temperature and the Curie temperature and when the second magnetic layer 4 does not have a compensating temperature and exhibits a rare-earth metal rich characteristic in the temperature range between room temperature and the Curie temperature, the direction of the initializing magnetic field Hinit and that of the recording magnetic field Hw differ from each other. In this case, overwriting by light-intensity modulation is carried out by rotating the magneto-optical disk 10 in a reverse direction and performing recording at a position which is separated from the laser light spot by the predetermined distance just before the recorded portion of the magneto-optical disk 10 passes through the magnet 22. It is also possible to dispose the magnet 22 in a position (upper position in FIG. 19(a)) above the position of the laser beam spot and rotate the magneto-optical disk 10 in the rotating direction shown in FIG. 19(a).

When the magnet 22 was a permanent magnet of 1.21 T and had dimensions (width×height×length) and a gap shown in Table 6, overwriting by light-intensity modulation was satisfactory without old information remaining on the magneto-optical disk 10, and a satisfactory signal to noise ratio (C/N) of 46 dB was achieved. Similarly to the fourth embodiment, in this embodiment, since the magnet 22 generates not only the initializing magnetic field but also the recording magnetic field, there is no need to include a member for generating a recording magnetic field in a magneto-optical recording device, thereby enabling a reduction in the size of the magneto-optical recording device.

TABLE 6

| Width | Height | Length | Gap | (unit: mm) Distance |
|---|---|---|---|---|
| 20 | 1.6 | 24 | 0.5 | 2–6 |
| 20 | 0.8 | 24 | 0.5 | 2–6 |
| 20 | 0.8 | 24 | 1.0 | 2–3 |
| 20 | 1.6 | 26 | 0.5 | 2–4 |
| 20 | 1.6 | 26 | 1.0 | 2–5 |
| 20 | 0.8 | 26 | 0.5 | 2–6 |
| 20 | 0.8 | 26 | 1.0 | 2–3 |
| 24 | 1.6 | 24 | 0.5 | 2–4 |
| 24 | 1.6 | 24 | 1.0 | 2–5 |
| 24 | 0.8 | 24 | 0.5 | 3–6 |
| 24 | 0.8 | 24 | 1.0 | 2–3 |
| 27 | 1.6 | 27 | 0.5 | 2–4 |
| 27 | 1.6 | 27 | 1.0 | 2–5 |
| 27 | 0.8 | 27 | 0.5 | 3–6 |
| 27 | 0.8 | 27 | 1.0 | 2–3 |
| 24 | 1.6 | 10 | 0.5 | 2–4 |
| 24 | 1.3 | 10 | 0.5 | about 3 |
| 24 | 1.0 | 10 | 0.4 | about 2.5 |
| 24 | 0.8 | 10 | 0.3 | about 1.5 |
| 27 | 1.1 | 10 | 0.5 | about 2.5 |
| 27 | 1.0 | 10 | 0.4 | about 2 |
| 27 | 0.7 | 10 | 0.3 | about 1.5 |

The samples #10 to #19 in the above-mentioned embodiments are used as the magneto-optical disk 10 in this embodiment. However, it is also possible to use a magneto-optical disk having the two-layer structure like the samples #1 to #9 if the first magnetic layer 3 shows a transition metal rich characteristic in a temperature range between room temperature and the Curie temperature and if the second magnetic layer 4 has a compensating temperature and exhibits a rare-earth metal rich characteristic in a temperature range between room temperature and the compensating temperature and a transition metal rich characteristic in a temperature range between the compensating temperature and the Curie temperature.

The following description discusses a seventh embodiment of the present invention. The members having the same function as in the above-mentioned embodiment will be designated by the same code and their description will be omitted.

A magneto-optical disk (magneto-optical recording medium) 10 of this embodiment includes at least two magnetic layers like the samples #10 to #19.

Figure 20C:
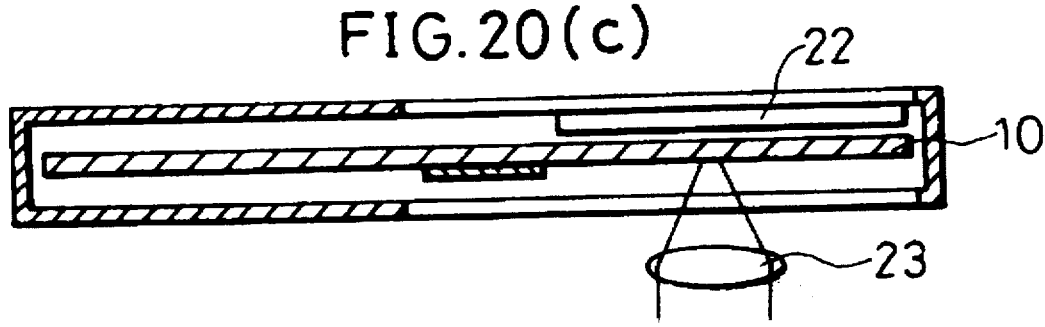

As illustrated in FIGS. 20 (a) to 20(c), a magneto-optical disk cartridge (magneto-optical recording medium cartridge) 70 of this embodiment contains the magneto-optical disk 10. The magnet 22 and a magnet 71 are included in the magneto-optical disk cartridge 70 so that they are located in opposite positions (lower and upper positions in FIG. 20(a)) with the incident position of the light beam therebetween on the same side of the magneto-optical disk 10. Those positions are respectively separated from a laser beam spot by a predetermined distance.

The magnets 22 and 71 are magnetized in parallel with the magneto-optical disk 10 so that the direction of magnetization of the magnet 22 and that of the magnet 71 become opposite to each other when seen from the cross sections thereof.

Since the magnets 22 and 71 are disposed in the vicinity of the laser beam spot, they generate magnetic fields whose directions are uniform and substantially perpendicular to the surface of the magneto-optical disk 10 in a section where the magneto-optical disk 10 is stored, more specifically, in the incident position of the light beam and in the vicinity thereof. Namely, the directions of magnetic fields generated by the magnet 22 in and in the vicinity of the incident position of the light beam and the directions of magnetic fields generated by the magnet 71 in and in the vicinity of the incident position of the light beam are all aligned in a direction substantially perpendicular to the surface of the magneto-optical disk 10. Among those magnetic fields, the magnetic field generated in the vicinity of the incident position of the light beam functions as a magnetic field for initializing the magneto-optical disk 10 (initializing magnetic field), while the magnetic field generated in the incident position of the light beam functions as a magnetic field for recording (recording magnetic field).

Information was recorded on and reproduced from the sample #10 of the magneto-optical disk 10 using the magneto-optical disk cartridge 70 under the conditions where laser power PH of high level I was 10 mW, laser power PL of low level II was 2 mW, reproducing laser power PR of level III was 1 mW, and a recording bit length was 0.65 μm. The result shows that overwriting by light-intensity modulation was satisfactory without old information remaining on the magneto-optical disk 10, and a satisfactory signal to noise ratio (C/N) of 46 dB was achieved.

The magnets 22 and 71 are Nd series permanent magnets of 1.21 T (tesla). The dimensions of each of the magnets 22 and 71 are 24 mm (width in a radial direction of the magneto-optical disk 10)×1 mm (height)×10 mm (length in a rotating direction of the magneto-optical disk 10). The actual distance (hereinafter referred to as gap) between each magnet and the magneto-optical disk 10 is 1

The magneto-optical disk 10 is initialized just above the magnet 22 by the magnetic fields (initializing magnetic fields) of the magnet 22, and recording is performed by the magnetic fields (recording magnetic fields) of the magnets 22 and 71 at the position of the laser beam spot converged by the objective lens 23. The magnetic field Kinit generated just above the magnet 22 was not smaller than 2.5 kOe, and the recording magnetic field Hw generated on the position of the laser beam spot was equal to 400 (Oe).

The reason why the magnets 22 and 71 of this embodiment have a smaller thickness is as follows. Since the direction of magnetization of the magnet 22 and that of magnet 71 are opposite to each other when viewing the cross sections thereof shown in FIG. 19(b), a part of a loop drawn by the line of magnetic force overlaps the magneto-optical disk 10 in a direction perpendicular to the surface of the magneto-optical disk 10 at the position of the laser beam spot. As a result, increased magnetic fields are applied to the magneto-optical disk 10 by the magnets 22 and 71.

Here, the first magnetic layer 3 exhibits a transition metal rich characteristic in a temperature range between room temperature and the Curie temperature.

The second magnetic layer 4 has a compensating temperature, and exhibits a rare-earth metal rich characteristic in a temperature range between room temperature and the compensating temperature and a transition metal rich characteristic in a temperature range between the compensating temperature and the Curie temperature. In this case, since the direction of the initializing magnetic field Hinit and that of the recording magnetic fields Hw are equal to each other, overwriting by light-intensity modulation is carried out by performing recording at a position which is separated from the laser light spot by the predetermined distance just after the recorded portion of the magneto-optical disk 10 passes through the magnet 22.

When the magnet 22 was a permanent magnet of 1.21 T and had dimensions (width×height×length) and a gap shown in Table 7, overwriting by light-intensity modulation was satisfactory without old information remaining on the magneto-optical disk 10, and a satisfactory signal to noise ratio (C/N) of 46 dB was achieved. In this embodiment, since the magnet 22 generates not only the initializing magnetic field but also the recording magnetic field, there is no need to include a member for generating a recording magnetic field in a magneto-optical recording device, thereby enabling a reduction in the size of the magneto-optical recording device.

Additionally, although not shown in the drawings, it is also possible to dispose two magnets in the corresponding positions of the magnets 22 and 71 on the opposite side of the magneto-optical disk. Namely, four magnets in total may be provided.

TABLE 7

| Width | Height | Length | Gap | (unit: mm) Distance |
|---|---|---|---|---|
| 20 | 1 | 24 | 0.5 | 2–6 |
| 20 | 0.5 | 24 | 0.5 | 2–6 |
| 20 | 0.5 | 24 | 1.0 | 2–3 |
| 20 | 1 | 26 | 0.5 | 2–4 |
| 20 | 1 | 26 | 1.0 | 2–5 |
| 20 | 0.5 | 26 | 0.5 | 2–6 |
| 20 | 0.5 | 26 | 1.0 | 2–3 |
| 24 | 1 | 24 | 0.5 | 2–4 |
| 24 | 1 | 24 | 1.0 | 2–5 |
| 24 | 0.5 | 24 | 0.5 | 2–6 |
| 24 | 0.5 | 24 | 1.0 | 2–3 |
| 27 | 1 | 27 | 0.5 | 2–4 |
| 27 | 1 | 27 | 1.0 | 2–5 |
| 27 | 0.5 | 27 | 0.5 | 2–6 |
| 27 | 0.5 | 27 | 1.0 | 2–3 |
| 24 | 1 | 10 | 0.5 | 2–4 |
| 24 | 0.8 | 10 | 0.5 | about 3 |
| 24 | 0.6 | 10 | 0.4 | about 2.5 |
| 24 | 0.5 | 10 | 0.3 | about 1.5 |
| 27 | 0.7 | 10 | 0.5 | about 2.5 |
| 27 | 0.6 | 10 | 0.4 | about 2 |
| 27 | 0.4 | 10 | 0.3 | about 1.5 |

The samples #10 to #19 in the above-mentioned embodiments are used as the magneto-optical disk 10 in this embodiment. However, it is also possible to use a magneto-optical disk having the two-layer structure like the samples #1 to #9 if the first magnetic layer 3 shows a transition metal rich characteristic in a temperature range between room temperature and the Curie temperature and if the second magnetic layer 4 has a compensating temperature and exhibits a rare-earth metal rich characteristic in a temperature range between room temperature and the compensating temperature and a transition metal rich characteristic in a temperature range between the compensating temperature and the Curie temperature.

The magneto-optical disk 10 for use in the magneto-optical disk cartridges of above-mentioned embodiments was explained as a light-intensity modulation overwritable recording medium having at least two magnetic layers. When the magnet in the magneto-optical disk cartridge is disposed in a position which is separated from the laser beam spot by a predetermined distance and magnetized in parallel with the magneto-optical disk, the magnet generates not only an initializing magnetic field but also a recording magnetic field. With this structure, it is not necessary to include a member for generating a recording magnetic field in a magneto-optical recording device, thereby enabling a reduction in the size of the magneto-optical recording device. Moreover, as described above, since there is no need to include a member for generating a recording magnetic field in the magneto-optical recording device, it is possible to use the magneto-optical disk cartridge for a single-layer medium including a magnetic film having a large coercive force at room temperature. Hence, the magneto-optical recording device and the magneto-optical disk are more conveniently used for various purposes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium cartridge comprising a magneto-optical recording medium and at least one magnet and defining a gap between a surface of said at least one magnet and a surface of said magneto-optical recording medium opposite said surface of said at least one magnet, said gap being in a range of approximately 0.3 mm to 1 mm said at least one magnet disposed in said cartridge having a thickness of approximately 1.4 mm to 2 mm, and being magnetized in a direction substantially parallel to a moving direction of said magneto-optical recording medium and substantially simultaneously applying a magnetic field to all of radius positions of said magneto optical recording medium.

2. The magneto-optical recording medium cartridge according to claim 1,
    wherein said magnet generates a magnetic field whose direction is substantially perpendicular to the surface of said magneto-optical recording medium.

3. The magneto-optical recording medium cartridge according to claim 1,
    wherein said at least one magnet comprises two magnets disposed in opposite positions so that said magneto-optical recording medium is placed therebetween, said two magnets being magnetized in opposite directions.

4. The magneto-optical recording medium cartridge according to claim 1, further comprising a yoke which is disposed in a position opposite to said magnet so that said magneto-optical recording medium is placed therebetween.

5. The magneto-optical recording medium cartridge according to claim 1,
    wherein said magnet is disposed in the vicinity of an incident position of a light beam.

6. The magneto-optical recording medium cartridge according to claim 5,
    wherein said magnet generates magnetic fields whose directions are substantially perpendicular to the surface of said magneto-optical recording medium in the incident position of the light beam and in the vicinity of the incident position of the light beam.

7. The magneto-optical recording medium cartridge according to claim 1,
   wherein said at least one magnet comprises two magnets disposed on one side of said magneto-optical recording medium and magnetized in opposite directions.

8. The magneto-optical recording medium cartridge according to claim 7,
   wherein said two magnets are disposed opposite positions so that the incident position of the light beam is located therebetween.

9. The magneto-optical recording medium cartridge according to claim 8,
   wherein said magnets generate magnetic fields whose directions are uniform and substantially perpendicular to the surface of said magneto-optical recording medium in the incident position of the light beam and in the vicinity of the incident position of the light beam.

10. The magneto-optical recording medium cartridge of claim 1 wherein said at least one magnet is extended in length so that it covers all of the radius positions of said magneto-optical recording medium.

* * * * *